(12) United States Patent
Abe et al.

(10) Patent No.: US 6,497,148 B1
(45) Date of Patent: Dec. 24, 2002

(54) GYROSCOPE AND INPUT APPARATUS USING THE SAME

(75) Inventors: Munemitsu Abe, Miyagi-ken (JP); Eiji Shinohara, Miyagi-ken (JP); Masayoshi Esashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 54 days.

(21) Appl. No.: 09/657,435

(22) Filed: Sep. 7, 2000

(30) Foreign Application Priority Data

Sep. 8, 1999 (JP) .......................................... 11-254963
Sep. 29, 1999 (JP) .......................................... 11-277617

(51) Int. Cl.[7] ................................................ G01P 9/04
(52) U.S. Cl. ..................................... 73/504.16; 310/370
(58) Field of Search ........................ 73/504.12, 504.14, 73/504.15, 504.16, 504.04, 504.02, 514.32; 310/370, 321, 329

(56) References Cited

U.S. PATENT DOCUMENTS

| | | | |
|---|---|---|---|
| 4,381,672 A | 5/1983 | O'Connor et al. ............ 73/505 |
| 4,628,734 A | 12/1986 | Watson ........................ 73/505 |
| 4,750,364 A * | 6/1988 | Kawamura et al. ........... 73/510 |
| 5,408,877 A * | 4/1995 | Greiff et al. ............. 73/504.12 |
| 5,451,828 A | 9/1995 | Tomikawa et al. ............ 73/505 |
| 5,821,420 A * | 10/1998 | Cho et al. ................ 73/504.16 |
| 6,257,058 B1 * | 7/2001 | Murata ..................... 73/504.16 |

FOREIGN PATENT DOCUMENTS

JP    11-281369    * 10/1999

* cited by examiner

*Primary Examiner*—Helen Kwok
(74) *Attorney, Agent, or Firm*—Brinks Hofer Gilson & Lione

(57) ABSTRACT

A gyroscope of the invention is provided with a tuning fork having three legs and a support, a top side glass substrate and a bottom side glass substrate between which the tuning fork is interposed, driving movable electrodes disposed on the top surface of each leg, driving fixed electrodes disposed on the bottom surface of the top side glass substrate so as to face to the driving movable electrodes, six detection movable electrodes connected to each other in parallel disposed on the top surface of the free end of each leg, and six detection fixed electrodes connected to each other in parallel disposed on the bottom surface of the top side glass substrate so as to face to the detection movable electrodes.

20 Claims, 25 Drawing Sheets

GYROSCOPE AND INPUT APPARATUS USING THE SAME

BACKGROUND OF THE INVENTION

1. Field of the Invention

This invention relates to a gyroscope and an input apparatus that uses the gyroscope, and more particularly relates to a gyroscope of the type that detects the displacement of a leg of a tuning fork particularly due to angular velocity input in the form of the capacitance change and an input apparatus that uses the gyroscope of this type.

2. Description of the Related Art

Heretofore, a gyroscope comprising a tuning fork consisting of conductive material such as silicon has been known. In the case of a gyroscope of this type, a leg of a tuning fork is vibrated in one direction, the vibration in the direction perpendicular to the above-mentioned vibration direction generated by Coriolis force is detected when the angular velocity round the center axis in the longitudinal direction of the leg is entered during vibration. Because the magnitude of the vibration generated by Coriolis force corresponds to the magnitude of the angular velocity, a gyrosensor is used as an angular velocity sensor, and for example, a gyrosensor is applied to a coordinate input apparatus or the like for a personal computer.

FIG. 33 is a diagram illustrating the structure of a tuning fork that is the main component of a conventional gyroscope. As shown in this diagram, the exemplary tuning fork 200 has three legs 201 and a support 202 that connects respective base sides of the legs 201, and consists of silicon that is rendered conductive. The tuning fork 200 is fixed on the base plate 203 by the support 202, and driving electrodes (not shown in the drawing) are provided respectively. under the legs 201. Therefore, when a voltage is applied on the driving electrodes, the legs 201 are vibrated in the vertical direction by electrostatic attractive force.

In the case of a gyroscope of this type, horizontal vibration is caused when angular velocity round the rotation axis in the longitudinal direction of the legs 201 is entered during vertical vibration, and the horizontal vibration is detected by use of a pair of detection electrodes 204 disposed on both sides of each leg 201. In detail, when a leg 201 is displaced in the horizontal direction, the gap between the detection electrode 204 disposed on one side of the leg 201 and the leg 201 is narrowed, the gap between the detection electrode 204 disposed on the other side of the leg 201 and the leg 201 is concomitantly widened, and as the result a pair of two electrostatic capacities formed by the detection electrodes 204 and the leg 201 changes. Based on the electrostatic capacity change, the magnitude of an input angular velocity can be detected.

In the case of a gyroscope having the structure described hereinabove, the narrow gap design between a leg 201 and adjacent legs 201 (referred to as inter-leg gap hereinafter) is limited because the detection electrodes 204 are disposed respectively on both sides of the legs 201. In detail, assuming that the width of a detection electrode 204 is denoted by x1, the gap between a detection electrode 204 and an adjacent leg 201 and a gap between adjacent detection electrodes 204 are denoted by x2, then an inter-leg gap G=2×1+3×2. Because of the working limit of x1 and x2 in silicon working by means of general semiconductor device fabrication technique, the narrow inter-leg gap G design has been limited.

On the other hand, it has been found that "Q-value", which is a performance index for representing the resonance magnitude of a device of this type becomes large if the inter-leg gap G of-a three-leg tuning fork is reduced. If Q-value could be made large, not only the detection sensitivity of angular velocity is expected to be improved but also the conversion efficiency from electric energy supplied to the device to vibration energy is expected to be improved, and thus the reduction of driving voltage will be reduced.

However as described hereinabove, though it is expected that the narrow inter-leg gap design is variously advantageous in miniaturization of a device, improvement of detection sensitivity, reduction of driving voltage, and the likes, the narrow inter-leg gap design has not been realized because the narrow inter-leg gap is limited in the case of the conventional gyroscope.

SUMMARY OF THE INVENTION

The present invention has been accomplished to solve the above-mentioned problem, and it is the object of the present invention to provide a high quality and low cost gyroscope that is variously advantageous as described hereinabove.

To achieve the above-mentioned object, the first gyroscope of the present invention is characterized by comprising a vibration member served as a tuning fork, a base material disposed so as to face to the above-mentioned vibration member, a driving means for driving the above-mentioned vibration member, a plurality of detection movable electrodes connected to each other in parallel and provided on the surface parallel to the displacement detection direction of the free end portion of the above-mentioned vibration member, each of which has a Width equal to or larger than the maximum amplitude in the displacement detection direction of the above-mentioned vibration member, and a plurality of detection fixed electrodes connected to each other in parallel and provided on the above-mentioned base material disposed so as to face to the above-mentioned plurality of detection movable electrodes and so as to form the capacitance between the above-mentioned plurality of detection fixed electrodes and the above-mentioned plurality of detection movable electrodes The detection principle of the gyroscope of the present invention is based on the detection of the vibration of a vibration member of a tuning fork (equivalent to the "leg" described hereinbefore) by means of capacitance change like the conventional gyroscope. Usually, the capacitance C is represented by the following equation.

$$C = \epsilon \cdot (S/d) \quad (1)$$

(wherein $\epsilon$ denotes the dielectric constant, S denotes the area of an electrode, and d denotes a gap between electrodes)

In the case of the conventional gyroscope, the change of a gap between a leg and a detection electrode due to vibration, namely the capacitance change due to the change of a gap d between electrodes in the equation (1), is detected. On the other hand, in the case of the gyroscope of the present invention, the change of the facing area between detection electrodes due to vibration, namely the capacitance change due to the change of the electrode area S in the equation (1), is detected.

In detail, in the case of the first gyroscope of the present invention, on the vibration member side, a plurality of detection movable electrodes connected to each other in parallel are provided on the surface parallel to the displacement detection direction of the free end, each of which detection movable electrodes has a width equal to or larger than the maximum amplitude of the vibration member in the displacement detection direction. On the other hand, on the base material side, a plurality of detection fixed electrodes connected to each other in parallel are provided and disposed so as to face to the above-mentioned plurality of detection movable electrodes, each of which detection fixed electrodes has a width equal to or larger than the maximum amplitude of the vibration member in the displacement detection direction. The structure described hereinabove is the most important characteristic of the gyroscope of the first gyroscope of the present invention.

Because of the structure described hereinabove, when the angular velocity round the rotation axis in the longitudinal direction of, the vibration member is entered while the vibration member of the tuning fork is being vibrated by means of a driving means, the vibration in the direction orthogonal to the above-mentioned vibration direction is caused due to Coriolis force. At that time, the detection movable electrodes on the vibration member side is facing to the detection fixed electrodes on the base material side, and the facing area between the detection movable electrodes and the detection fixed electrodes changes concomitantly with vibration of the vibration member, as the result the capacitance change is caused. By detecting the capacitance change, the angular velocity can be detected. The reason why the width of each detection electrode is to be equal to or larger than the maximum amplitude of the vibration member in the displacement detection direction is that the facing area between a detection movable electrode on the vibration member side and a detection fixed electrode on the base material side could become 0 to result in capacitance detection failure when the vibration member received a large angular velocity and the vibration member is vibrated maximum if the width of each detection electrode is smaller than the maximum, amplitude of the vibration member. Herein, the term "amplitude" only means the amplitude of vibration caused by Coriolis force generated when the angular velocity is entered as it is understood from "amplitude in the displacement detection direction", and will not means the amplitude of vibration caused by the driving means.

In detail, in the case of the first gyroscope of the present invention, in which base end portion of the vibration member is supported by an arbitrary base material, the detection fixed electrodes may be disposed on the base material so as to face to the detection movable electrodes of the vibration member, and it is not necessary to provide the detection electrode between legs unlike the conventional gyroscope. As the result, because the gap between legs can be minimized to the working limit of material of the tuning fork such as silicon, the Q-value is increased, the detection sensitivity is improved, and the driving voltage is reduced. As a matter of course, the size of the device can be miniaturized.

As the above-mentioned driving means, for example, driving electrodes may be provided on the vibration member side and the base material side so as to face each other. In this case, the driving electrodes are formed so as to extend in the extension direction of each vibration member, and these electrodes are desirably disposed apart from each other to prevent the parasitic capacitance between the driving electrode and the detection electrode. If the parasitic capacitance is generated between the driving electrode and the detection electrode, then the parasitic capacitance is also detected when the angular velocity is detected and the capacitance change caused between detection electrodes is to be detected, and functions as the noise component to thereby causes reduction of S/N ratio disadvantageously. However, such disadvantage is prevented by disposing the driving electrode and the detection electrode apart from each other.

The detection movable electrodes may be disposed on the top surface or the bottom surface of the vibration member of the tuning fork. In this case, the detection capacitance can be large, and the electrode is formed easily. Furthermore, the detection movable electrodes may be disposed on the end surface in the extension direction of the vibration member. In this case, the detection fixed electrodes can be formed in the same process as that for fabrication of the tuning fork, and the interference between the detection fixed electrodes and the driving means is reduced.

In the case the above-mentioned vibration member is formed of conductive material, the above-mentioned detection movable electrodes are preferably provided with interposition of an insulative film formed on at least on the free end portion of the vibration member.

As for the positional relation between each detection movable electrode and each detection fixed electrode, the end of each detection movable electrode and each corresponding detection fixed electrode are disposed desirably so as to deviate each other in the displacement detection direction of the vibration member by a distance equal to or larger than the maximum amplitude of the vibration member in the displacement detection direction.

The reason is that generally the vibration direction of the vibration member in the direction orthogonal to the driving direction changes depending on the direction of the angular velocity namely clockwise or anti-clockwise when the vibration member receives the angular velocity round the rotation axis in the longitudinal direction. In the case that each detection movable electrode and each corresponding detection fixed electrode are disposed with deviation, when the vibration member is displaced into any one direction, if the change occurs in the direction so as to increase the facing area between each detection movable electrode and each corresponding detection fixed electrode and concomitantly so as to increase the capacitance. On the other hand, when the vibration member is displaced in the reverse direction to the previous direction, the change occurs in the direction so as to decrease the facing area between each detection movable electrode and each corresponding detection fixed electrode and so as to decrease the capacitance without exception. Therefore because the direction of the angular velocity can bee detected by checking positive/negative of the change magnitude of the capacitance, it is preferable to dispose each detection movable electrode and each corresponding detection fixed electrode with deviation. In other words, if the ends of each detection movable electrode and each corresponding detection fixed electrode are disposed without deviation, the facing area between each detection movable electrode and each corresponding detection fixed electrode changes so as to decrease always regardless of the displacement direction of the vibration member, in that case only the absolute value of the angular velocity is detected but the direction of the angular velocity cannot be detected. Furthermore, it is difficult to incorporate each detection movable electrode and each corresponding detection fixed electrode without deviation.

An input apparatus of the present invention is characterized by comprising the first gyroscope of the above-mentioned present invention. By incorporating the gyroscope of the present invention, a small-sized apparatus such as a coordinate input apparatus for a personal computer or the like is realized.

The second gyroscope of the present invention is provided with a vibration member served as a tuning fork, a base material disposed so as to face to the above-mentioned vibration member, a driving means for driving the above-mentioned vibration member, a plurality of detection movable electrodes provided on the surface side parallel to the displacement detection direction of the free end portion of the above-mentioned vibration member, each of which detection movable electrodes has a width equal to or larger than the maximum amplitude of the above-mentioned vibration member in the displacement detection direction, and detection fixed electrodes comprising two electrode groups, each group of which two electrode groups comprises a plurality of electrodes, which electrodes of the above-mentioned two electrode groups are provided on the above-mentioned base material with facing to the above-mentioned plurality of detection movable electrodes so as to form the capacitance respectively with any electrode of the above-mentioned plurality of detection movable electrodes, the outer end of each of which electrodes of the one electrode group out of the above-mentioned two electrode groups is disposed with deviation to the outside from the one outer end of the above-mentioned detection movable electrodes that are facing to the above-mentioned each electrode by a distance equal to or larger than the maximum amplitude of the above-mentioned vibration member in the above-mentioned displacement detection direction, the outer end of each of which electrodes of the other electrode group out of the above-mentioned two electrode groups is disposed with deviation to the outside from the other outer end of the above-mentioned detection movable electrodes that are facing to the above-mentioned each electrode by a distance equal to or larger than the maximum amplitude of the above-mentioned vibration member in the above-mentioned displacement detection direction, and each of which above-mentioned electrodes has a width equal to or larger than the maximum amplitude of the above-mentioned vibration member in the displacement detection direction, wherein the difference between the sum of capacitances formed between the one electrode group out of the above-mentioned detection fixed electrodes and the above-mentioned plurality of detection movable electrodes that are facing to the one electrode group and the sum of capacitances formed between the other electrode group out of the above-mentioned detection fixed electrodes and the above-mentioned plurality of detection movable electrodes that are facing to the other electrode group is detected.

The third gyroscope of the present invention is provided with a vibration member served as a tuning fork, a base material disposed so as to face to the above-mentioned vibration member, a driving means for driving the above-mentioned vibration member, a plurality of detection fixed electrodes provided on the above-mentioned base material so as to face to the surface parallel to the displacement detection direction of the free end portion of the above-mentioned vibration member, each of which detection fixed electrodes has a width equal to or larger than the maximum amplitude of the above-mentioned vibration member in the displacement detection direction, and detection movable electrodes comprising two electrode groups, each of which groups comprises a plurality of electrodes, which electrodes of the above-mentioned two electrodes are disposed on the both sides parallel to the displacement detection direction of the free end portion of the above-mentioned vibration member with facing to any electrode of the above-mentioned plurality of detection fixed electrodes so as to form the capacitance with the above-mentioned plurality of detection fixed electrodes, the outer end of each of which electrodes of the one electrode group out of the above-mentioned two electrode groups is disposed with deviation to the outside from the one outer end of the above-mentioned detection fixed electrodes that are facing to the above-mentioned each electrode by a distance equal to or larger than the maximum amplitude of the above-mentioned vibration member in the above-mentioned displacement detection direction, the outer end of which electrodes of the other electrode group out of the above-mentioned two electrode groups is disposed with deviation to the outside from the other outer end of the above-mentioned detection fixed electrodes that are facing to the above-mentioned each electrode by a distance equal to or larger than the maximum amplitude of the above-mentioned vibration member in the above-mentioned, displacement detection direction, and each of which above-mentioned electrodes has a width equal to or larger than the maximum amplitude of the above-mentioned vibration member in the displacement detection direction, wherein the difference between the sum of capacitances formed between the one electrode group out of the above-mentioned detection movable electrodes and the above-mentioned plurality of detection fixed electrodes that are facing to the one electrode group and the sum of capacitances formed between the other electrode group out of the above-mentioned detection movable electrodes and the above-mentioned plurality of detection fixed electrodes that are facing to the other electrode group is detected.

In detail, the structure of the second gyroscope of the present invention is most characteristic as described herein under. On the vibration member side, a plurality of detection movable electrodes, each of which detection movable electrodes has a width equal to or larger than the maximum amplitude of the vibration member in the displacement detection direction, are provided on the surface of the vibration member parallel to the displacement detection direction of the free end portion. On the other hand, on the base material side, detection fixed electrodes comprising two electrode groups are provided, each electrode of which detection fixed electrodes has a width equal to or larger than the maximum amplitude of the vibration member in the displacement detection direction, each group of which two electrode groups comprises a plurality of electrodes, each electrode of which two electrode groups is disposed with facing to any one of the above-mentioned plurality of detection movable electrodes so as to form a capacitance with any one of the plurality of detection movable electrodes, the outer end of each electrode of the one electrode group of which two electrode groups is disposed so as to deviate outside from the one outer end of each detection movable electrode by a distance equal to or larger than the maximum amplitude of the vibration member in the displacement detection direction, and the outer end of each electrode of the other electrode group of which two electrode groups is disposed so as to deviate outside from the other outer end of each detection movable electrode by a distance equal to or larger than the maximum amplitude of the vibration member in the displacement detection direction.

The, method for detecting the capacitance change is characteristic as described herein under. The difference between the sum of a plurality of capacitances formed between the electrodes of the one electrode group out of two electrode groups comprising a plurality of detection fixed electrodes and a plurality of detection movable electrodes that are facing to the detection fixed electrodes respectively and the sum of a plurality of capacitances formed between the electrodes of the other electrode group out of two electrode groups comprising a plurality of detection fixed electrodes and a plurality of detection movable electrodes that are facing to the detection fixed electrodes respectively is detected.

The structure of the third gyroscope of the present invention is most characteristic as described herein under. On the base material side, a plurality of detection fixed electrodes, each electrode of which detection fixed electrodes has a width equal to or larger than the maximum amplitude of the vibration member in the displacement detection direction, are provided on the surface parallel to the displacement detection direction of the free end of the vibration member. On the other hand, on the vibration member side, detection movable electrodes comprising two electrode groups, each electrode of which detection movable electrodes has a width equal to or larger than the maximum amplitude of the vibration member in the displacement detection direction, each electrode of which two electrode groups is faced to any one of the plurality of detection fixed electrodes so as to form a capacitance with any one of the plurality of detection fixed electrodes, the outer end of each electrode of the one electrode group out of which two electrode groups is disposed with deviation to the outside from the one outer end of each detection fixed electrode by a distance equal to or larger than the maximum amplitude of the vibration member in the displacement detection direction, and the outer end of each electrode of the other electrode group out of which two electrode groups is disposed with deviation to the outside from the other outer end of each detection fixed electrode by a distance equal to or larger than the maximum amplitude of the vibration member in the displacement detection direction.

The method for detecting the capacitance change is characteristic as described herein under. The difference between the sum of a plurality of capacitances formed between the electrodes of the one electrode group out of two electrode groups comprising a plurality of detection movable electrodes and a plurality of detection fixed electrodes that are facing to the detection movable electrodes respectively and the sum of a plurality of capacitances formed between the electrodes of the other electrode group out of two electrode groups comprising a plurality of detection movable electrodes and a plurality of detection fixed electrodes that are facing to the detection movable electrodes respectively is detected. In other words, in the second and third gyroscopes of the present invention, the differential detection method is used for detection of the capacitance change magnitude.

Because the structure as described hereinabove is applied, in the case of the second and third gyroscopes of the present invention, in which base end portion of the vibration member is supported by an arbitrary base material, the detection fixed electrodes may be disposed on the base material so as to face to the detection movable electrodes of the vibration member, and it is not necessary to provide the detection electrode between legs unlike the conventional gyroscope. As the result, because the gap between legs can be minimized up to the working limit of material of the tuning fork such as silicon, the Q-value is increased, the detection sensitivity is improved, and the driving voltage is reduced. As a matter of course, the size of the device can be miniaturized.

Furthermore, in the case of the second and third gyroscope of the present invention, the detection electrode provided on the other side that is facing to the detection electrode provided on any one of the base material side and the vibration member side comprises two electrode groups, the outer end of each electrode of the one electrode group out of the two electrode groups deviates outside from the one outer end of the detection electrode provided on the facing side by a distance equal to or larger than the maximum amplitude of the vibration member in the displacement detection direction, and the outer end of each electrode of the other electrode group deviates outside from the other outer end of the detection electrode provided on the facing side by a distance equal to or larger than the maximum amplitude of the vibration member in the displacement detection direction. Because of the structure as described hereinabove, when the vibration member is displaced in any one direction, if the facing area between each electrode of the one electrode group and the detection electrode that is facing to the electrode of the one electrode group increases and the capacitance increases concomitantly, then the facing area between each electrode of the other electrode group and the detection electrode that is facing to the electrode of the other electrode group decreases and the capacitance decreases concomitantly on the other hand. When the difference between the sum of a plurality of capacitances formed on the one electrode group side out of the two electrode groups comprising detection electrodes and the sum of a plurality of a capacitances formed on the other electrode group side is made, the initial capacitance value is canceled because the initial capacitance values of both sides without displacement are equal to each other, and the capacitance change magnitude of the one side is positive and the capacitance change magnitude of the other side is negative, as the result only the capacitance change magnitude is detected. Therefore, the noise component included in the initial capacitance value is canceled, and the detection accuracy is thereby improved.

Furthermore, in the case of the structure in which the number of electrodes of each electrode group out of the two electrode groups comprising detection electrodes is equal to the number of electrodes of the other detection electrodes, that is, the structure in which each electrode of the two electrode groups forms a pair with one facing detection electrode, the width direction is used most effectively.

As the above-mentioned driving means, for example, driving electrodes may be provided on the vibration member side and the base material side so as to face each other. In this case, the driving electrode is formed extendedly in the extension direction of each vibration member, and these electrodes are disposed desirably apart from each other to prevent the parasitic capacitance between the driving electrode and the detection electrode. If the parasitic capacitance is formed between the driving electrode and the detection electrode, the parasitic capacitance is detected undesirably when the angular velocity is detected and the capacitance change generated between the driving electrode and the detection electrode is detected, the parasitic capacitance functions as the noise component to cause the reduction of S/N ratio disadvantageously. However, if the driving electrode and the detection electrode are disposed apart from each other, such disadvantage is prevented.

The detection side electrode may be provided on the top surface or on the bottom surface of the tuning fork. In this case, the detected capacitance can be large, and the electrode can be formed easily. Otherwise, the detection movable electrode may be disposed on the end surface in the extension direction of the vibration member. In this case, the detection fixed electrode can be formed in the same process as that for forming the tuning fork, and the interference between the detection fixed electrode and the driving means is reduced.

In the case that the above-mentioned vibration member consists of conductive material, the above-mentioned plurality of detection movable electrode or a plurality of pairs of detection movable electrodes are provided preferably with interposition of an insulative film formed at least on the free end portion of the vibration member.

Another input apparatus of the present invention is characterized in that the second and/or third gyroscope of the present invention is incorporated. By using the gyroscope of the present invention, for example, a small-sized apparatus such as a coordinate input apparatus or the like is realized.

DETAILED DESCRIPTION OF THE PREFERRED EMBODIMENTS

First Embodiment

The first embodiment of the present invention will be described in detail hereinafter with reference to FIG. 1 to FIG. 5.

Figure 1:
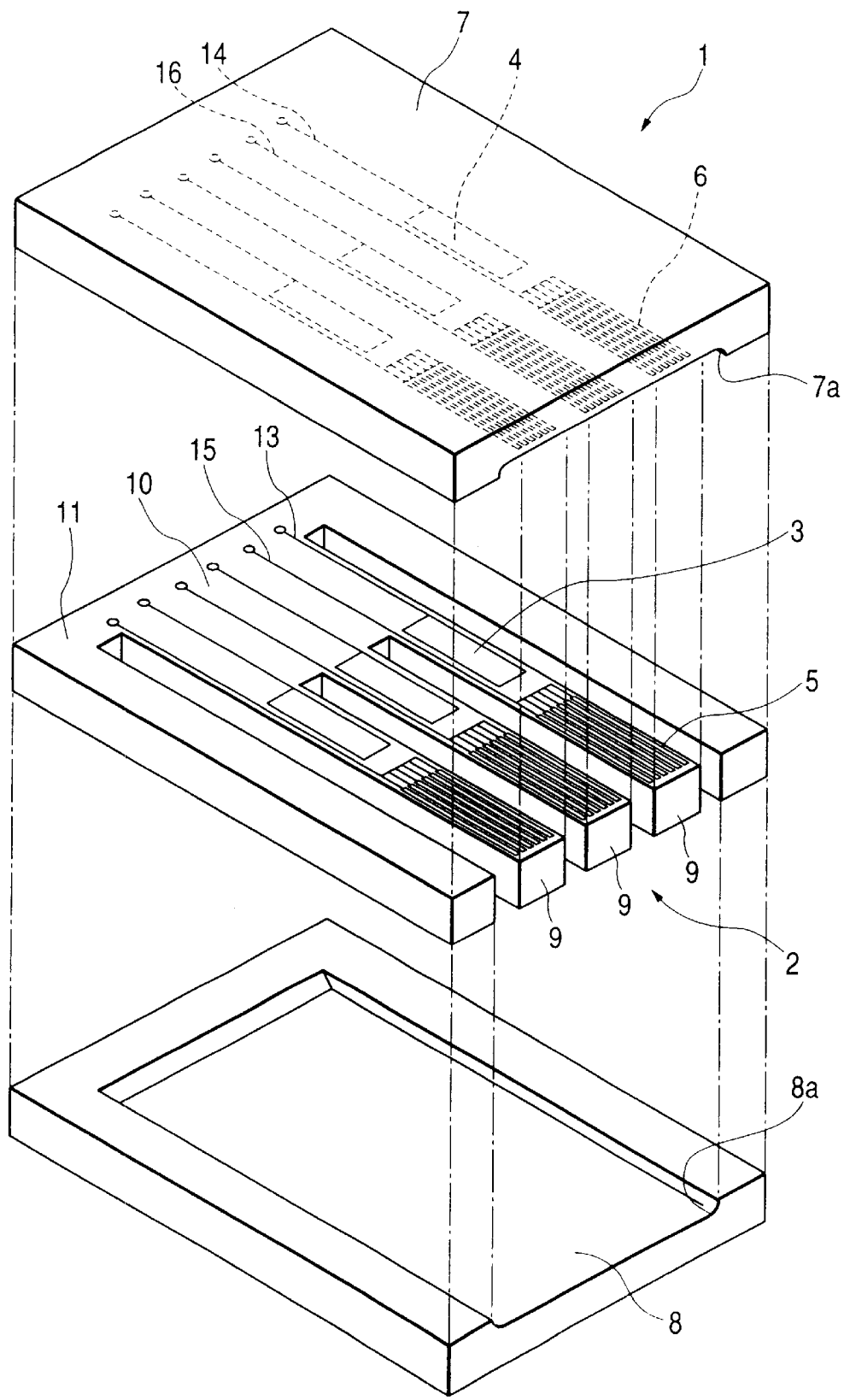
FIG. 1 is an exploded perspective view illustrating a gyroscope of the first embodiment of the present invention.
Figure 2:
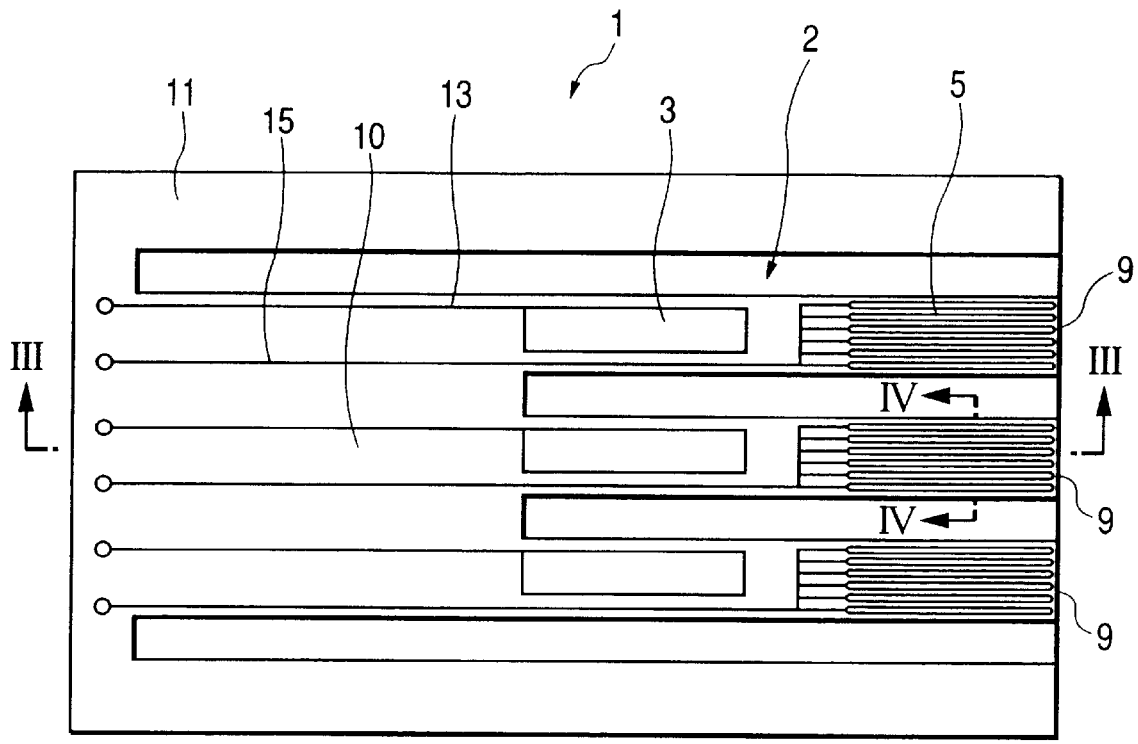
FIG. 2. is a plan view of the gyroscope illustrated in FIG. 1.
Figure 3:
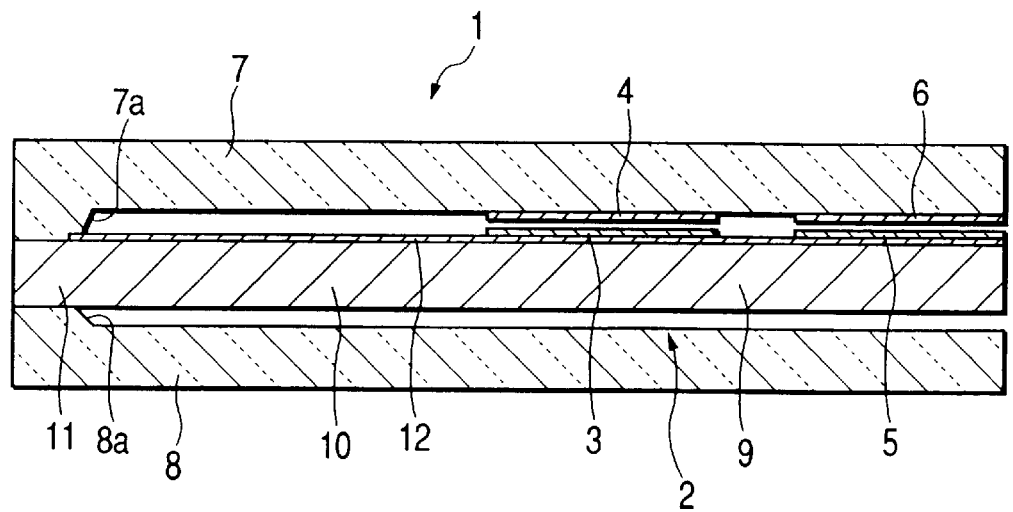
FIG. 3 is a side cross sectional view along the line III—III of FIG. 2.
Figure 4:
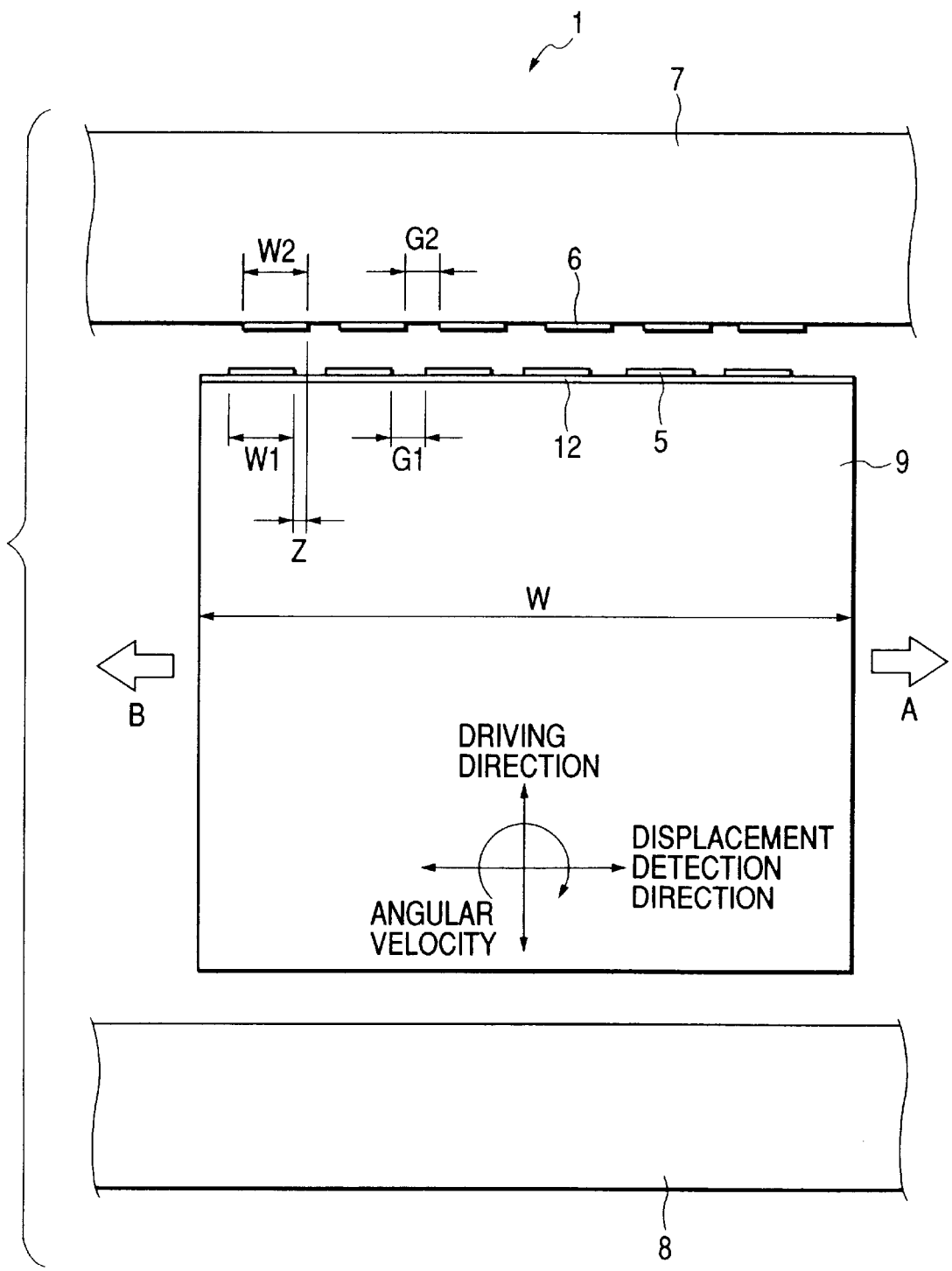
FIG. 4 is a side cross sectional view along the line IV—IV of FIG. 2 that is an enlarged view illustrating the electrode structure of one leg.

FIG. 1 is an exploded perspective view illustrating the whole structure of a gyroscope of the present embodiment, FIG. 2 is a plan view, FIG. 3 is a cross sectional view along the line III—III of FIG. 2, FIG. 4 is a cross sectional view along the line IV—IV of FIG. 2 (an enlarged view illustrating one leg), and FIG. 5 is a process sectional view illustrating a fabrication process of a gyroscope. In these drawings, denotes a tuning fork, 3 denotes a driving movable electrode, 4 denotes a driving fixed electrode, 5 denotes a detection movable electrode, 6 denotes a detection fixed electrode, 7 denotes a top side glass substrate (base material), and 8 denotes a bottom side glass substrate.

The gyroscope 1 of the present invention is provided with a three-leg tuning fork 2 comprising three legs 9 (vibration member) and a support 10 that connects base end sides of these three legs 9. A frame 11 is provided around the tuning fork 2. Each of the tuning fork 2 and the frame 11 is formed of a conductive single silicon substrate having a thickness of approximately 200 $\mu$m. As shown in FIG. 3, the frame 11 is fixed between the top side glass substrate 7 Land the bottom glass substrate 8, pits 7a and 8a having a depth of approximately 10 $\mu$m are formed on the respective inside surfaces of the two glass substrates 7 and 8 on the areas above and under the tuning fork 2 respectively. Thereby, gaps having a distance of approximately 10 μm are formed between the glass substrates 7 and 8 and the tuning fork 2, the gaps allow the legs 9 of the tuning fork 2 to vibrate.

As shown in FIG. 1 and FIG. 2, a driving movable electrode 3 that extends in the longitudinal direction of a leg 9 is provided on each leg 9 on the top surface of the leg 9 at the base end side. Though not shown in FIG. 1 for easy understanding a driving movable electrode 3 is formed with interposition of an insulative film 12 consisting if silicon oxide film or the like having a thickness of approximately 500 nm formed on a silicon substrate as shown in FIG. 3.

On the other hand, a driving fixed electrode 4 that extends in the longitudinal direction of a leg 9 is provided on each leg 9 at the position that faces to the above-mentioned driving movable electrode 3 formed on the bottom surface of the top side glass substrate 7. A driving movable electrode 3 and a driving fixed electrode 4 are formed of an Al (aluminum) film, Cr (chromium) film, Pt (platinum)/Ti (titanium) film or the like having a thickness of approximately 300 nm. Wirings 13 and 14 served for supplying the driving signal to these electrodes 3 and 4 consisting of the same layer as that of the electrodes 3 and 4 such as aluminum film, chromium film or the like are formed monolithically with these electrodes 3 and 4.

Six detection movable electrodes 5 that extend in the longitudinal direction of a leg 9 are provided on each leg 9 at the position on the free end side of the leg 9 with respect to the position where a driving movable electrode 3 is formed on the top surface of the leg 9. These six detection movable electrodes 5, like the driving movable electrodes 3, are formed of aluminum film, chromium film or the like having a thickness of approximately 300 nm like the driving electrode, and formed with interposition of an insulative film 12 consisting of silicon oxide film formed on the silicon substrate. Furthermore, these six detection movable electrodes 5 are connected to each other in parallel, and a wiring 15 for leading out the detection signal is formed.

On the other hand, six detection fixed electrodes 6 that face to the detection movable electrodes 5 respectively are formed on the bottom surface of the top side glass substrate 7 at the position on the free end side of a leg 9 with respect to the position of the driving fixed electrode 4. Similarly to the detection movable electrodes 5, these six detection fixed electrodes 6 are connected to each other in parallel, and a wiring 16 for leading out the detection signal is formed.

As shown in FIG. 4, though the detection movable electrodes 5 on each leg 9 and the detection fixed electrodes 6 on the top glass substrate 7 are disposed so as to be facing each other, actually the detection movable electrodes 5 and the detection fixed electrodes 6 are disposed so as to be facing each other but not exactly lined up and so that the respective side ends of the detection movable electrodes 5 other but not exactly lined up corresponding respective side ends of the detection fixed electrodes 6 in the displacement detection direction of the leg 9. In detail, the detection movable electrodes 5 and the detection fixed electrodes 6 are disposed so that the side ends of the detection movable electrodes 5 deviate from the corresponding side ends of the detection fixed electrodes 6 by a distance equal to or larger than the maximum amplitude of the leg 9 in the displacement detection direction. The width W1 of each detection movable electrode 5 and the width W2 of each detection fixed electrode 6 have a size equal to or larger than the maximum amplitude of the leg 9.

Herein, an example of the size of the components is shown herein under. The width W of a leg 9 is 200 μm, the width W1 of each detection movable electrode 5 and the width W2 of each detection fixed electrode 6 are 20 μm respectively, the gap G1 between adjacent detection movable electrodes and the gap G2 between adjacent detection fixed electrodes are 10 μm respectively, and the deviation magnitude Z between the side end of a detection movable electrode 5 and the corresponding side end of a detection fixed electrode 6 is 5 μm. The maximum amplitude of the leg 9 in the displacement detection direction is designed to be 1 μm.

The potential equalization pattern consisting of the same aluminum film, chromium film or the like as that of the driving fixed electrode 4 and the detection fixed electrode 6 is provided on the inner surface side of the top glass substrate 7 and on the inner surface side of the bottom glass substrate 8 on the area where the driving fixed electrode 4 and the detection fixed electrode 6 are provided actually. The potential equalization pattern is not necessary for function of the gyroscope 1, but it is necessary for the purpose of fabrication, and it is therefore not shown in the drawing.

Next, an exemplary method for fabrication of a gyroscope 1 having the structure described hereinabove will be described.

Figure 5A:
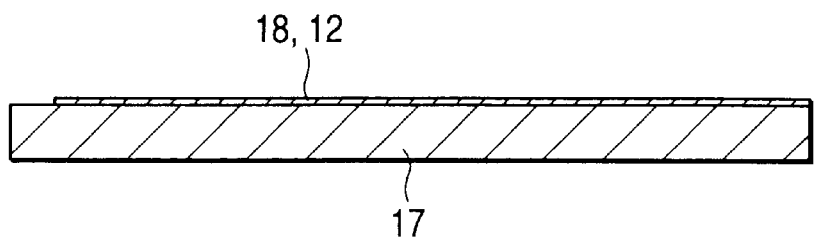
FIGS. 5A–5E are process cross sectional views sequentially illustrating the fabrication process of the gyroscope illustrated in FIG. 1.

As shown in FIG. 5A, , a silicon substrate 17 is prepared, a silicon oxide film 18 is formed on the top surface of the silicon substrate 17 by, means of thermal oxidation method or TEOS-CVD method, and the silicon oxide film 18 is patterned by means of well known photolithography so that the silicon oxide film 18 on the area where the frame 11, which is to be connected to the top glass substrate 7, is to be formed is removed. The silicon oxide film 18 functions as the insulative film 12 for electrically insulating the conductive silicon and the electrodes formed on the silicon oxide film 18 in-between.

Figure 5B:
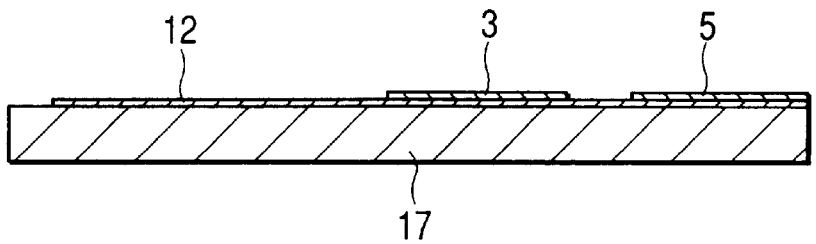

Next, as shown in FIG. 5B, aluminum film, chromium film or the like having a thickness of approximately 300 μm is formed on the entire top surface of the silicon substrate 17 including on the surface of the silicone oxide film 18 by means of spattering, and then the formed film is patterned by means of well known photolithography technique to form the driving movable electrode 3 and the detection movable electrode 5 at the predetermined position on the top surface of the silicon substrate 17.

Separately, two glass substrates are prepared, chromium film is formed on the surface by means of spattering, a resist pattern is formed, and the chromium film is etched with aid of the resist pattern as a mask, though the process is not shown in the drawing. Next, the glass substrate surface is subjected to hydrofluoric acid etching with aid of the resist pattern and chromium film as a mask to form a pit having a depth of approximately 10 μm on the area of the glass substrate that is corresponding to the position of the tuning fork. Subsequently, the resist pattern and the chromium pattern are removed. Next, one glass substrate is processed as described herein under. In detail, aluminum film, chromium film or the like having a thickness of approximately 300 μm is formed on the entire surface of the glass substrate by means of spattering, the formed film is patterned by means of well known photolithography technique to form the driving fixed electrode 4, detection fixed electrode 6, and potential equalization pattern, and this substrate is used as the top side glass substrate 7. Similarly, the other glass substrate is processed as described herein under. In detail, aluminum film, chromium film or the like is formed on the entire surface of the glass substrate by means of spattering, the formed film is patterned to form the potential equalization pattern, and this glass substrate is used as the bottom side glass substrate 8.

Figure 5C:
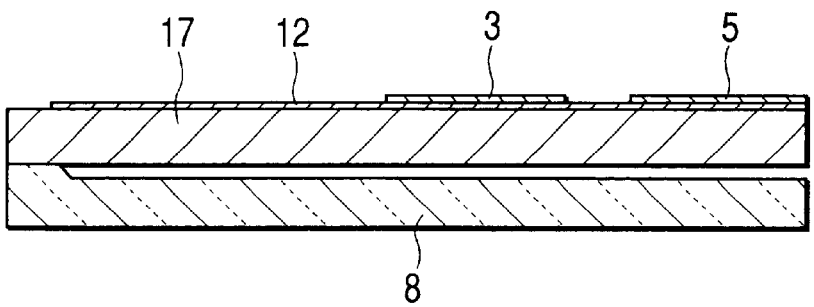

Next, as shown in FIG. 5C, the bottom surface of the silicon substrate 17 and the bottom side glass substrate 8 are bonded together by means of anodic bonding method. At that time, the area that is to be served as the frame 11 of the silicon substrate 17 is bonded. The positive potential is applied to the silicon substrate and the negative potential is applied to the glass substrate to bond between the silicon and glass in the anodic bonding method. At that time, because the gap between the silicon substrate 17 and the bottom side glass substrate 8 surface is only approximately 10 $\mu$m on the area that is to be served as the tuning fork 2, the silicon substrate 17 could be bent by electrostatic attractive force to result in contact with the bottom side glass substrate 8 and to result in bonding each other, as the result a tuning fork 2 that can vibrate cannot be formed. In view of the above, to prevent bonding of the portion that is not to be bonded with the bottom side glass substrate 8, the potential equalization pattern on the bottom side glass substrate 8 surface is used so that the potential of the bottom glass substrates surface and the potential of the silicon substrate 17 are equalized to each other. This is also the case for the top side glass substrate 7.

Figure 5D:
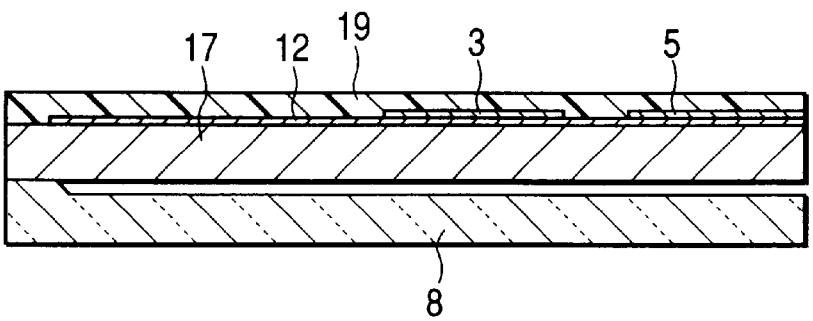
Figure 5E:
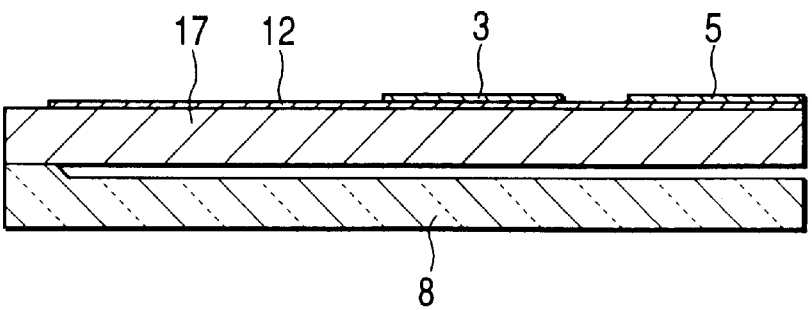

Next, as shown in FIG. 5D, a resist pattern 19 is formed on the silicon substrate 17 surface. At that time, the planer shape of the resist pattern 19 is the shape of the tuning fork 2 and frame 11 as shown in FIG. 2 where the silicon will remains. The silicon substrate 17 is subjected to anisotropic etching such as reactive ion etching with aid of the resist pattern 19 as a mask so as to be penetrated through the thickness. Thereby, the tuning fork 2 and the frame 11 are formed, the tuning fork 2 is free from contact with the bottom side glass substrate 8. Subsequently, the resist pattern 19 is removed and the semi-finished product as shown in FIG. 5E is obtained.

Next, the top surface of the silicon substrate 17 that has been bonded with the bottom side glass substrate 8 is bonded with the top side glass substrate 7 by means of anodic bonding method. At that time, the frame 11 of the silicon substrate 17 is bonded with the top side glass substrate 7 as shown in FIG. 3. Through the above-mentioned process, the gyroscope 1 of the present embodiment is completed.

When the gyroscope 1 of the present embodiment is used, an oscillator that is served as a driving source is connected between the wiring 13 of the driving movable electrode 3 and the wiring 14 of the driving fixed electrode 4, a capacitance detector is connected between the wiring 15 of the detection movable electrode 5 and the wiring 16 of the detection fixed electrode 6, and the tuning fork 2 is grounded. When the oscillator is driven to apply a voltage having a frequency of several kHz between the driving movable electrode 3 and the driving fixed electrode 4, the leg 9 of the tuning fork 2 is vibrated in the vertical direction. When an angular velocity is entered round the rotation axis in the longitudinal direction of the leg 9 in this state, vibration in the horizontal direction is caused depending on the magnitude of the entered angular velocity. At that time, because the detection movable electrode 5 of each leg 9 of the tuning fork 2 is facing to the detection fixed electrode 6 of the top side glass substrate 7, the facing area between the detection movable electrode 5 and the detection fixed electrode 6 changes concomitantly with the horizontal vibration of the leg 9 to thereby cause the capacitance change. The capacitance change is detected by means of the capacitance detector and the magnitude of the angular velocity can be detected thereby.

Furthermore, in the case of the present embodiment, as shown in FIG. 4. because the respective side edges of the detection movable electrode 5 and detection fixed electrode 6 that are disposed so as to face each other are located with deviation, for example when the leg 9 is displaced in the right direction (in the direction of arrow A) with respect to the glass substrates 7 and 8 in FIG. 4, the facing area between each detection movable electrode 5 and each corresponding detection fixed electrode 6 increases, and the capacitance increases thereby. On the other hand, when the leg 9 is displaced in the left direction (in the direction of arrow B) with respect to the glass substrates 7 and 8, the facing area between each detection movable electrode 5 and each corresponding detection fixed electrode 6 decreases, and the capacitance decreases thereby. As the result, the direction of the angular velocity can be detected by detecting whether the capacitance change is positive or negative.

Therefore, it is not necessary to provide detection electrodes between a leg and a leg in the gyroscope 1 of the present embodiment unlike the conventional gyroscope. As the result, the inter-leg gap can be minimized up to the approximate working limit of the silicon substrate, for example, several tens $\mu$m, and Q-value is increased. For example, in the case of a gyroscope having legs with a width of 200 $\mu$m, if the inter-leg gap is 300 $\mu$m to 400 $\mu$m, then the Q-value is around 1000, but if the inter-leg gap is several tens $\mu$m, then the Q-value is around 2000, namely approximately double value. The increased Q-value brings about the improved detection sensitivity of an angular velocity sensor and reduced driving voltage. Furthermore, the device can be miniaturized.

The applicant of the present invention has already applied a patent for a gyroscope having another structure for achieving the object of the present invention. The gyroscope of the present invention is the improved version of the gyroscope disclosed in the previous patent application, and is advantageous over the gyroscope of the previous patent application in the following points.

Figure 14:
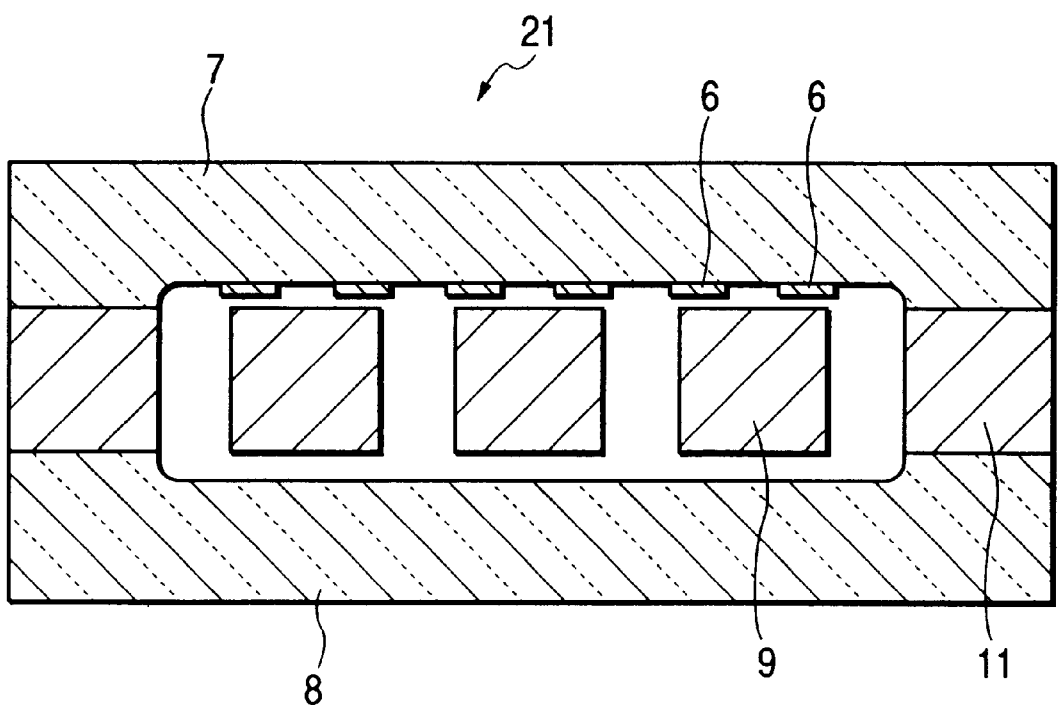
FIG. 14 is a side cross sectional view along the line XIV—XIV of FIG. 13.
Figure 13:
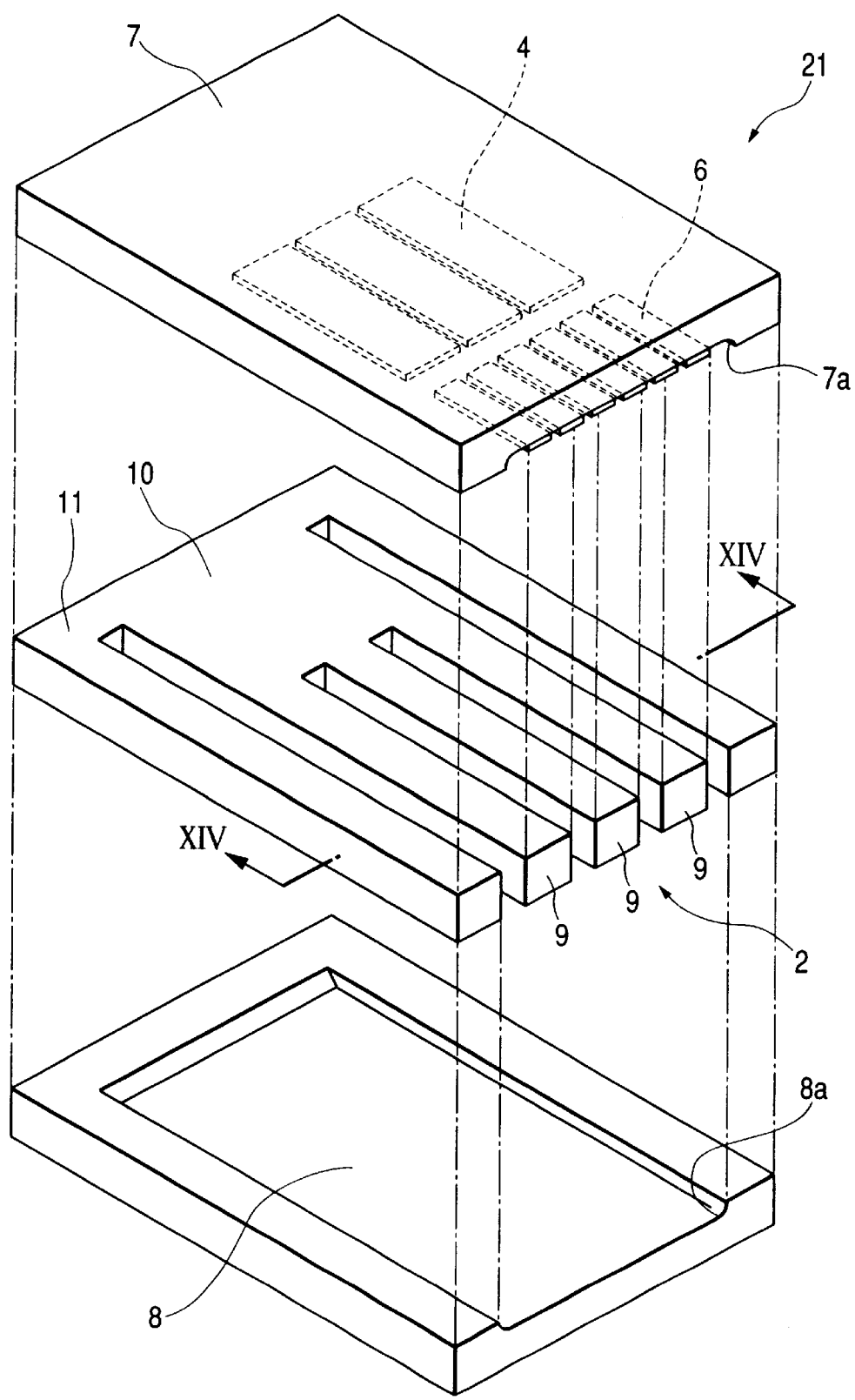
FIG. 13 is an exploded perspective view illustrating one example of a gyroscope in accordance with the invention that has been applied by the present applicant already.

FIG. 13 is an exploded perspective view of the gyroscope of the previous patent application, and FIG. 14 is a cross sectional view along the line XIV—XIV. In FIG. 13 and FIG. 14, the common components to those of the gyroscope of the present embodiment shown in FIG. 1 to FIG. 4 are given the same characters, and the detailed description is omitted.

The gyroscope 21 shown in FIG. 13 and FIG. 14 is different from the gyroscope 1 of the above-mentioned embodiment in that two detection fixed electrodes 6 are provided for each leg 9 on the bottom surface of the top side glass substrate 7. Furthermore, because the leg 9 itself consisting of conductive silicon is served for functioning as the electrode, neither the driving electrode nor the detection electrode is provided on the leg 9.

Figure 9:
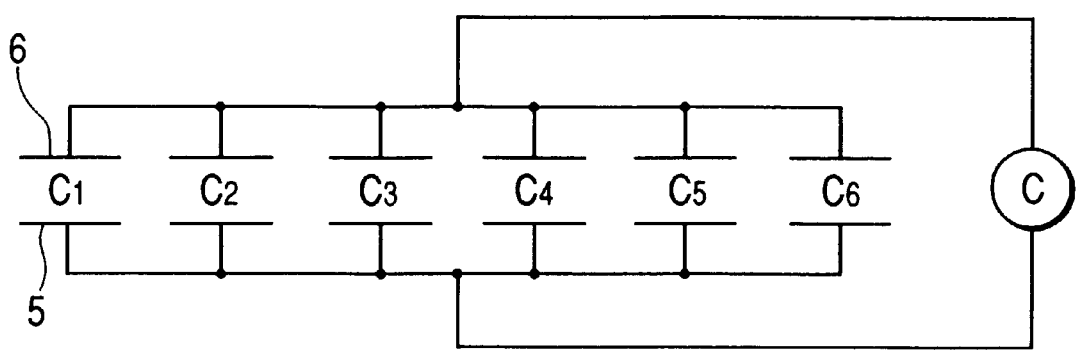
FIG. 9 is an equivalent circuit diagram illustrating the structure of the capacitance of the gyroscope of the third embodiment of the present invention.

In the case of the gyroscope 1 of the present embodiment, six detection movable electrodes 5 and six detection fixed electrodes 6 are provided for each leg 9, and the detection movable electrodes are connected in parallel to each other and the detection fixed electrodes are connected in parallel to each other. This structure is shown in the form of an equivalent circuit diagram as shown in FIG. 9. Capacitances, each of which comprises a pair of detection movable electrode 5 and detection fixed electrode 6 that are facing each other, are denoted by C1, C2, C3, C4, C5, and C6 respectively. The capacitance of one leg 9, at the time when the angular velocity, is not entered to the leg 9, Coriolis force is not exerted, and the displacement is 0 (initial state), is denoted by Cdt1, then the Cdt1 is represented by the following equation.

$$Cdt1 = C1 + C2 + C3 + C4 + C5 + C6 \qquad (2)$$

Next, the capacitance of one leg 9, at the time when the angular velocity is entered to the leg 9, Coriolis force is exerted to cause some displacement, is denoted by Cdt2, then the Cdt2 is represented by the following equation.

$$Cdt2 = (C1 + \Delta C1) + (C2 + \Delta C2) + \ldots + (C6 + \Delta C6) \qquad (3)$$

(wherein $\Delta C1, \Delta C2, \ldots, \Delta C6$ are capacitance change magnitude of each capacitance).

The equation (2) and the equation (3) are combined to obtain the equation (4) described herein under.
[Formula 1]

$$C_{dt2} = \sum_{i=1}^{6} C_i + \sum_{i=1}^{6} \Delta C_i \qquad (4)$$

If n detection electrodes are provided for one leg generally, the capacitance is represented by the following equation (5).
[Formula 2]

$$C_{dt2} = \sum_{i=1}^{n} C_i + \sum_{i=1}^{n} \Delta C_i \qquad (5)$$

In one exemplary case, Cdt1 is approximately 1 pF and $\Delta$Ci is in a range from 0.01 to 0.1 pF.

In the case of the gyroscope 21 of the previous patent application shown in FIG. 13 and FIG. 14, because two detection electrodes 6 are provided for one leg 9, n in the equation (5) is 2, and for example, the capacitance change magnitude for one leg is approximately 0.02 to 0.2 pF. On the other hand, in the case of the gyroscope 1 of the present embodiment, n in the equation (5) is 6, then the capacitance change magnitude is, for example, approximately 0.06 to 0.6 pF. Therefore, when a leg 9 is subjected to the same magnitude of angular velocity to cause the same magnitude of displacement, the capacity change of the gyroscope 1 of the present embodiment is three times larger than that of the gyroscope 21 of the previous patent application. Therefore, n detection electrodes provided for one leg 9 functions to improve the sensitivity (n/2) times in comparison with the gyroscope 21 of the previous patent application. As described hereinabove, according to the gyroscope 1 of the present invention, the detection sensitivity is improved the more.

In the gyroscope 1 of the present embodiment, because the tuning fork 2 is interposed between the glass substrates 7 and 8, the turning fork 2 is protected by the glass substrates 7 and 8, and the gyroscope 1 is therefore easily handled. Furthermore, because the dust is prevented from entering to the tuning fork 2, the disturbance is suppressed, and the sensor accuracy is improved. The structure is acceptable of vaccum package, and the Q-value is improved the more thereby.

Second Embodiment

The second embodiment of the present invention will be described with reference to FIG. 6.

Figure 6:
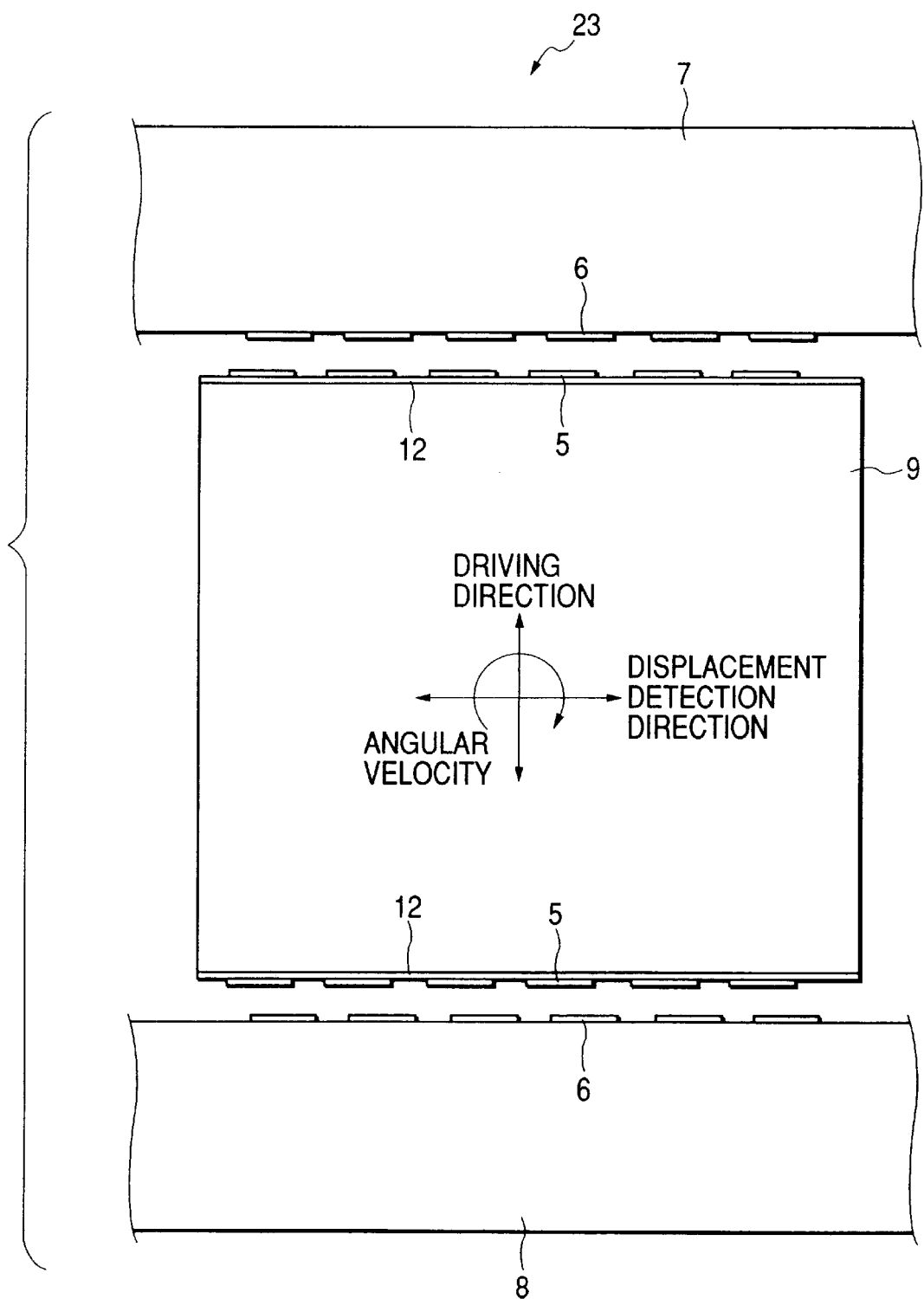
FIG. 6 is an enlarged view illustrating the electrode structure of one leg of the gyroscope of the second embodiment of the present invention.

FIG. 6 is an enlarged view illustrating the electrode structure of one leg of a gyroscope of the present embodiment. The basic structure of the gyroscope of the present embodiment is quite the same as that of the first embodiment, but the gyroscope of the present embodiment is different from that of the first embodiment only in the electrode structure for one leg. The common components shown in FIG. 6 to those shown in FIG. 4 are given the same characters, and only the different components are described and the description of the common components is omitted.

The detection movable electrodes 5 and the detection fixed electrodes 6 are provided on the top surface of legs 9 and the bottom surface of the top side glass substrate 7 respectively in the first embodiment, on the other hand in the case of the gyroscope 23 of the present embodiment, the same electrodes are provided also on the top surface of the bottom side glass substrate 8 and the bottom surface of each leg 9. In detail, six detection movable electrodes 5 are provided for each leg 9 on the bottom surface of the leg 9 at the position near the free end so as to extend in the longitudinal direction of the leg 9. The six detection movable electrodes 5 consist of aluminum film, chromium film or the like having a thickness of approximately 300 nm like the electrodes on the top surface side of the leg 9, and formed with interposition of an insulative film 12 consisting of silicon oxide film or the like. Furthermore, the six detection movable electrodes 5 are connected in parallel to each other, and furthermore a wiring (not shown in the drawing) for leading out the detection signal is formed.

On the other hand, six detection fixed electrodes 6 are provided for each leg 9 on the top surface of the bottom side glass substrate 8 correspondingly to the detection movable electrodes 5. Also in the case of the bottom surface side detection movable electrodes 5 as in the case of the top surface side detection electrodes 5 of the leg 9, the side end of each detection movable electrode 5 is positioned so as to deviate from the side end of each corresponding detection fixed electrode 6 by the distance equal to or larger than the maximum amplitude of the leg 9 in the displacement detection direction.

Also in the case of the gyroscope 23 of the present invention, the Q-value can be increased because the detection electrodes between the legs 9 are eliminated. As the result, the same effect, such as improvement of the detection sensitivity of the angular velocity sensor, reduction of the driving voltage, and miniaturization of the device, as obtained by the first embodiment, can be obtained by applying the gyroscope 23 of the present embodiment.

Furthermore, as for the detection sensitivity, in the case of the present embodiment, the six capacitances formed on the top surface side of the leg 9 and the six capacitances formed on the bottom surface side of the leg 9 are all connected in parallel and total twelve capacitances are formed resultantly for one leg 9, as the result the sensitivity is two times larger than that of the gyroscope 1 of the first embodiment, and is six times larger than that of the gyroscope 21 of the previous patent application shown in FIG. 13 and FIG. 14.

Third Embodiment

The third embodiment will be described hereinafter with reference to FIG. 7 and FIG. 8.

"... provided on the surface parallel to the displacement detection direction of the free end of the abovementioned vibration member . . . , a plurality of detection movable electrodes . . ." is described above in the present invention, wherein examples in which the detection movable electrodes are formed on the top surface or bottom surface of the leg out of "the surface parallel to the displacement detection direction" of the vibration member (leg) are exemplified in the first and second embodiments. On the other hand, in the third embodiment, an example in which detection movable electrodes are formed on the free end surface of the leg will be described.

Figure 7:
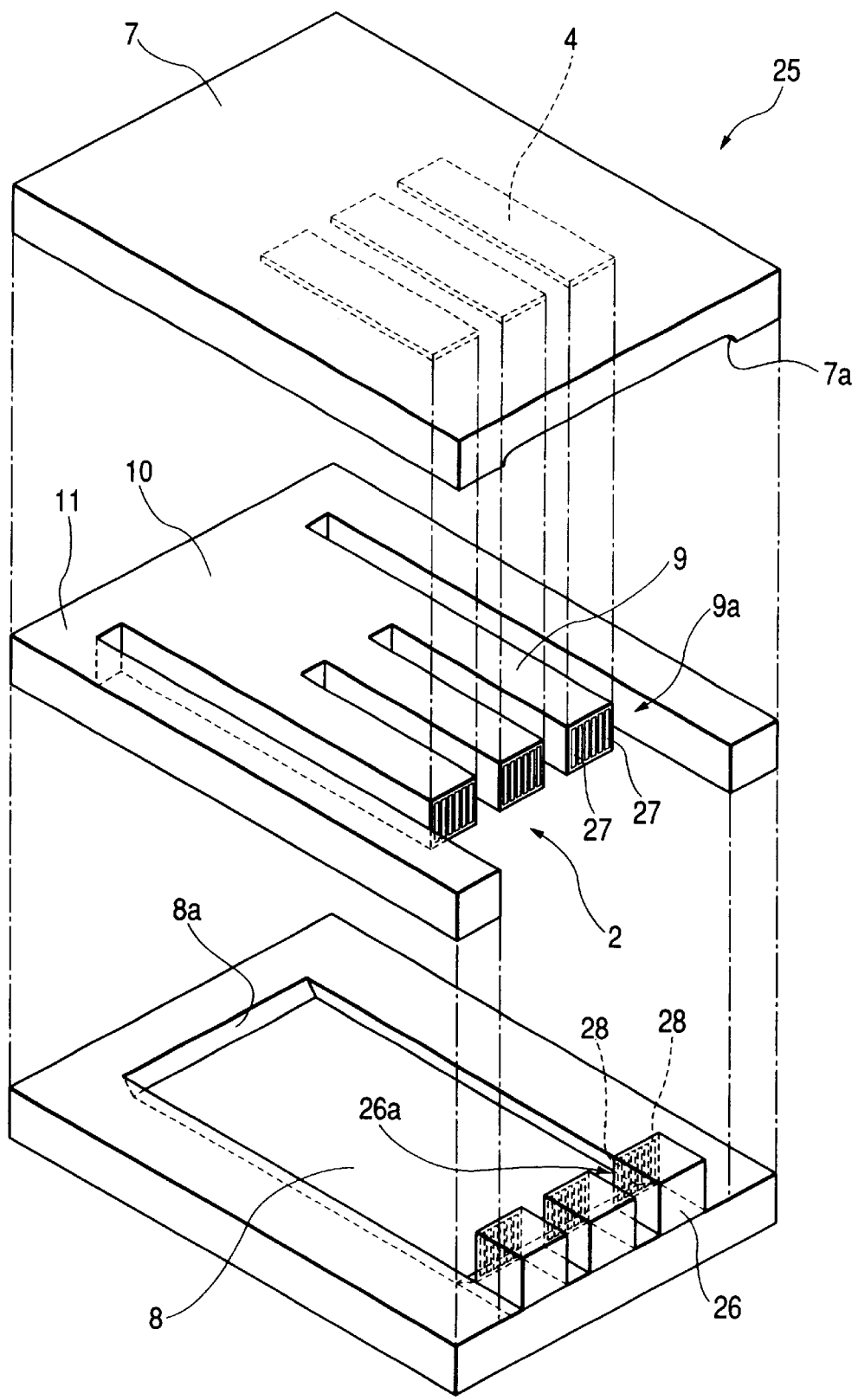
FIG. 7 is an exploded perspective view illustrating a gyroscope of the third embodiment of the present invention.
Figure 8:
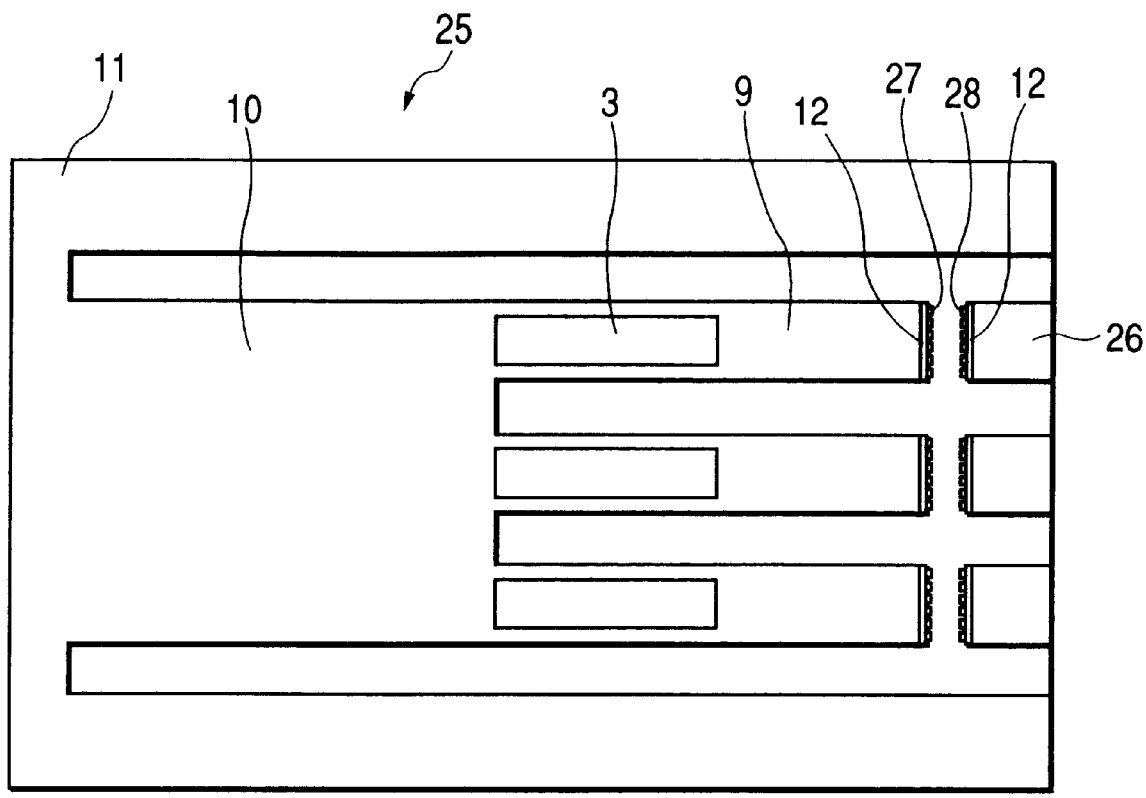
FIG. 8 is a plan view of the gyroscope illustrated in FIG. 7.

FIG. 7 is an exploded perspective view illustrating the whole structure of a gyroscope of the present embodiment, and FIG. 8 is a plan view. The present embodiment is different from the first and second embodiments in only the detection electrode structure. Therefore, the common components shown in FIG. 7 and FIG. 8 to those shown in FIG. 1 and FIG. 2 are given the same characters, and the detailed description of the common components is omitted.

As shown in FIG. 7 and FIG. 8, in the case of the gyroscope 25 of the present embodiment, one detection electrode mounting member is fixed on the bottom side glass substrate 8 for each leg 9 so as to face to the free end surface 9a located in the extending direction of the leg 9. The areas of the respective surfaces of a leg 9 and a detection electrode mounting member 26 that are facing each other are the same. The detection electrode mounting member 26 is formed of a conductive single silicon substrate having a thickness of approximately 200 μm as well as the tuning fork 2 and the frame 11.

The six detection movable electrodes 27 are provided for each leg 9 on the free end surface 9a of the leg 9 so as to extend in the direction perpendicular to the displacement detection direction of the leg 9 namely in the vertical direction. The six detection movable electrodes 27 consist of aluminum film, chromium film or the like, and formed on the free end surface 9a of each leg with interposition of an insulative film 12 formed of silicon oxide film or the like. These six detection movable electrodes 27 are connected in parallel to each other. On the other hand, on the surface of a detection electrode mounting member 26 that faces to the corresponding free end surface 9a of the leg 9, six detection fixed electrodes 28 are provided for each leg 9 correspondingly to the detection movable electrodes 27 so as to extend in the vertical direction with interposition of an insulative film 12. These detection fixed electrodes 28 are faced to the detection movable electrodes 27, and these six detection fixed electrodes 28 are connected in parallel to each other. The structure of the driving electrode is the same as that of the first and second embodiments.

In the case of the gyroscope 25 of the present embodiment, because the vibration direction (displacement detection direction) of the leg 9 caused by Coriolis force when the angular velocity is entered is identical with the vertical direction on the paper plane in FIG. 8, the facing area between a detection movable electrode 27 and the corresponding detection fixed electrode 28 changes concomitantly with the vibration of a leg 9 to cause the capacitance change. By detecting the capacitance change, the magnitude of the angular velocity can be detected.

Also in the case of the gyroscope 25 of the present embodiment, the Q-value can be increased because the detection electrodes located between legs 9 is eliminated. As the result, the same effect, such as improvement of the detection sensitivity of the angular velocity sensor, reduction of the driving voltage, and miniaturization of the device, as obtained by the first and second embodiments, can be obtained by applying the gyroscope 25 of the present embodiment.

Fourth Embodiment

Figure 11:
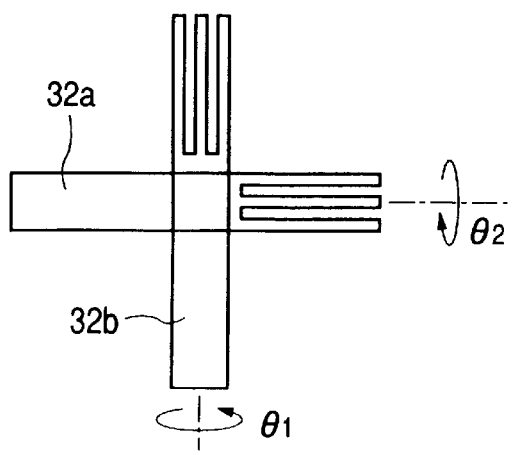
FIG. 11 is a plan view illustrating the layout of two gyroscopes used in the pen-type mouse shown in FIG. 10.
Figure 12:
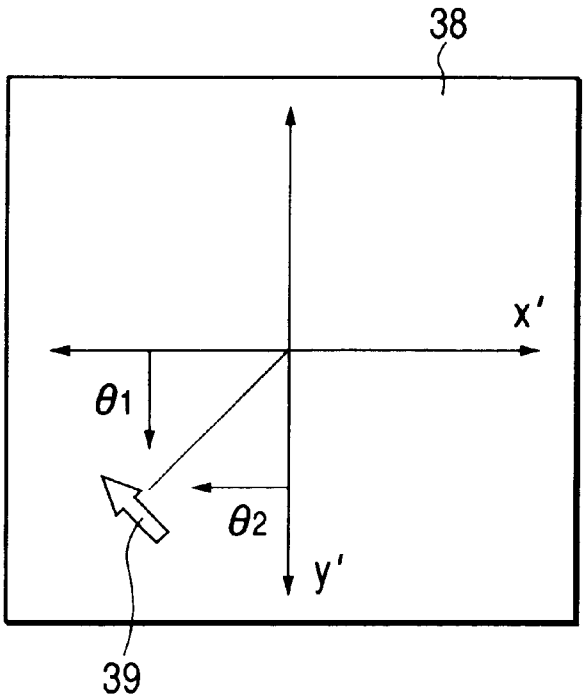
FIG. 12 is a front view illustrating a personal computer screen that is operated by use of the pen-type mouse shown in FIG. 10

The fourth embodiment of the present invention will be described hereinafter with reference to FIG. 10 to FIG. 12.

The present embodiment involves an exemplary input apparatus in which a gyroscope of any one of the first to third embodiments of the present invention, in detail an exemplary pen-type mouse served as a coordinate input apparatus for a personal computer.

Figure 10:
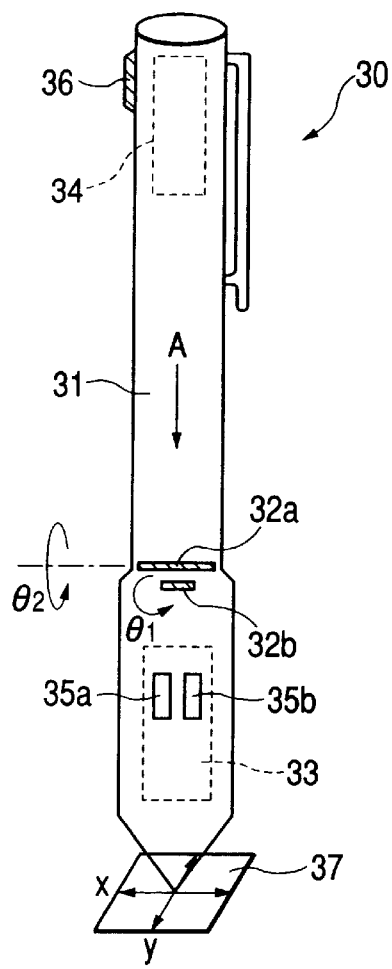
FIG. 10 is a perspective view illustrating a pen-type mouse in accordance with the fourth embodiment of the present invention.

As shown in FIG. 10, a pen-type mouse 30 of the present embodiment is provided-with two gyroscopes 32a and 32b as described in the first to third embodiments accommodated in a pen-type case 31. The two gyroscopes 32a and 32b are located so that the extension directions of the legs of the tuning forks of the gyroscopes 32a and 32b are orthogonal to each other in the top view of the pen-type mouse 30 (in the view from the arrow A direction in FIG. 10) as shown in FIG. 11. Furthermore, a driving detection circuit 33 served for driving the gyroscopes 32a and 32b and for detecting the angle of rotation is provided. Furthermore, a battery 34 is accommodated in the case 31, and two switches 35a and 35b that are equivalent to switches of a usual mouse and a switch 36 or the like of the mouse body are provided.

A user holds the pen-type mouse 30 and moves the pen tip in the desired direction, and then the user can move the cursor or the like on the screen of a personal computer in the direction corresponding to the motion of the pen tip. In detail, when the pen tip is moved in X-axis direction on the paper plane 37 in FIG. 10, the gyroscope 32b detects the rotation angle θ1, and when the pen tip is moved in Y-axis direction on the paper plane 37, then the gyroscope 32a detects the rotation angle θ2. When the pen tip is moved in the other direction, the rotation angle θ1 and the rotation angle θ2 are combined. Therefore, the personal computer side receives the signal corresponding to the rotation angle θ1 and the rotation angle θ2 from the pen type mouse 30, and the cursor 39 is moved by a distance corresponding to the magnitude of the rotation angles θ01 and θ2 correspondingly to X'-axis and Y'-axis on the screen 38 from the point where the cursor 39 or the like is located on the screen 38 as shown in FIG. 12. As described hereinabove, the operation that is the same as that realized by use of a usual mouse having the optical encoder can be also realized by use of the pen type mouse 30.

Because the gyroscopes 32a and 32b of the present invention used herein is advantageous in the small-size, reduced driving voltage, and high sensitivity, the gyroscope of the present invention is preferably used for the small-sized coordinate input apparatus such as the pen-type mouse 30 of the present embodiment. Furthermore, the gyroscope of the present invention is applied to various input apparatus that detect the angular velocity such as navigation system or head mount display.

The technical scope of the present invention is by no means limited to the above mentioned embodiments, and various modifications may be applied without departing from the spirit and scope of the present invention. For example, though an example in which the driving electrode is provided on the top side glass substrate side is described in the case of the gyroscope of the above-mentioned embodiments, the driving electrode may be provided on the bottom glass substrate side. Otherwise, the driving electrode may be provided not only on the one glass substrate but also on the other glass substrate. On the other hand, the number of detection electrodes for each leg may be arbitrary. However, the number is desirably as many as possible within working allowable range for improvement of sensitivity. The detection electrode may be formed on the different sides of the three legs, for example, on the top surface side of the first leg, on the bottom surface side of the second leg, and on the top surface side of the third leg. Examples in which the three-leg tuning fork is used are described in the above-mentioned embodiments, but the number of legs is arbitrary, and a one leg tuning fork may be used.

Gyroscope examples in which a tuning fork consisting of silicon is interposed between two glass substrate are described hereinabove, but a gyroscope may not have the top side glass substrate. In this case, the gyroscope has the simple structure. The compatibility between silicon and glass is preferable for bonding them together by means of anodic bonding method, but a substrate having the surface on which glass is coated may be used instead of a glass substrate. Carbon material may be used as the tuning fork material instead of silicon. The present invention is by no means limited by the detailed description of the material and dimension used for forming various components, and various changes and modifications may be applied.

Fifth Embodiment

The fifth embodiment of the present invention will be described hereinafter with reference to FIG. 15 to FIG. 19.

Figure 15:
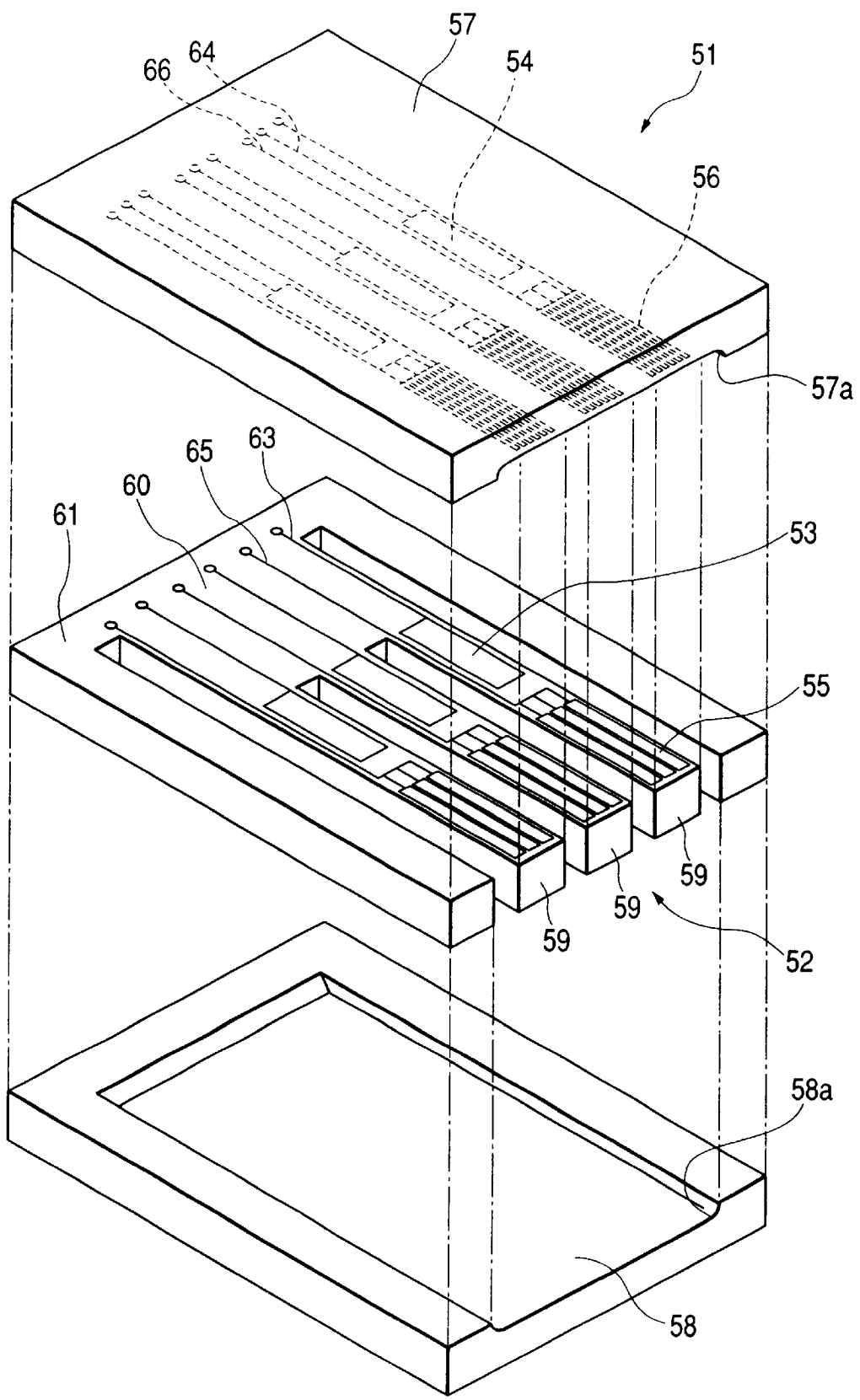
FIG. 15 is an exploded perspective view illustrating a gyroscope of the fifth embodiment of the present invention.
Figure 16:
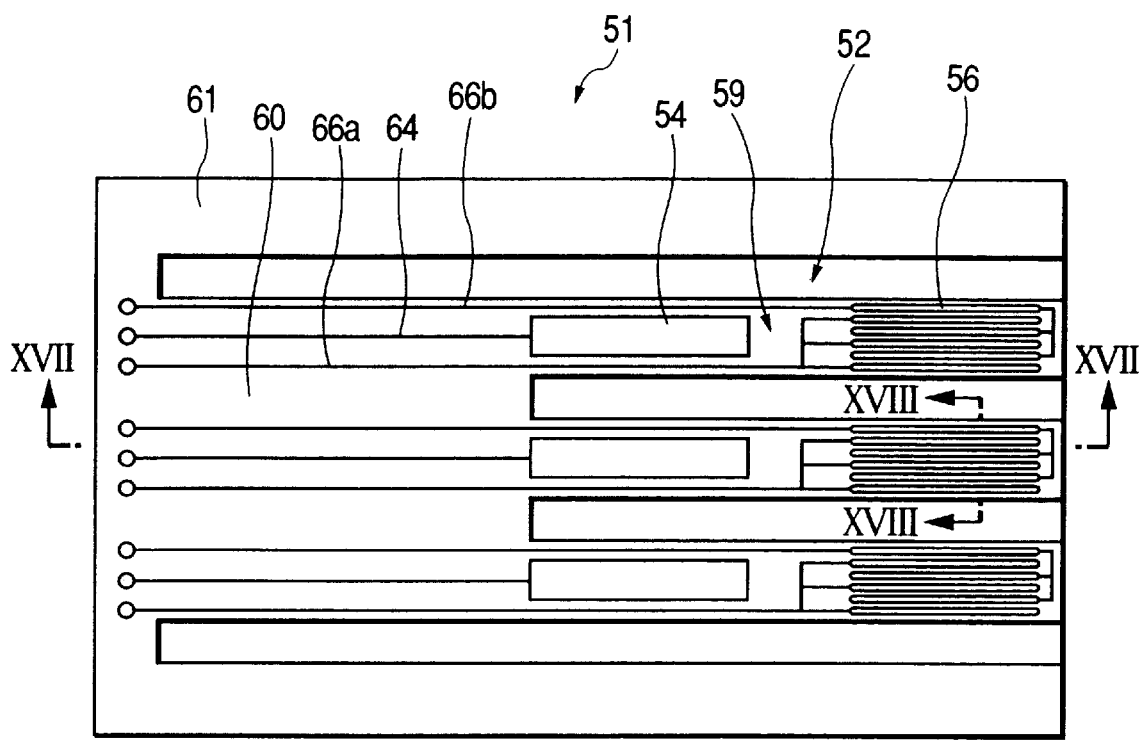
FIG. 16 is a plan view of the gyroscope illustrated in FIG. 15
Figure 17:
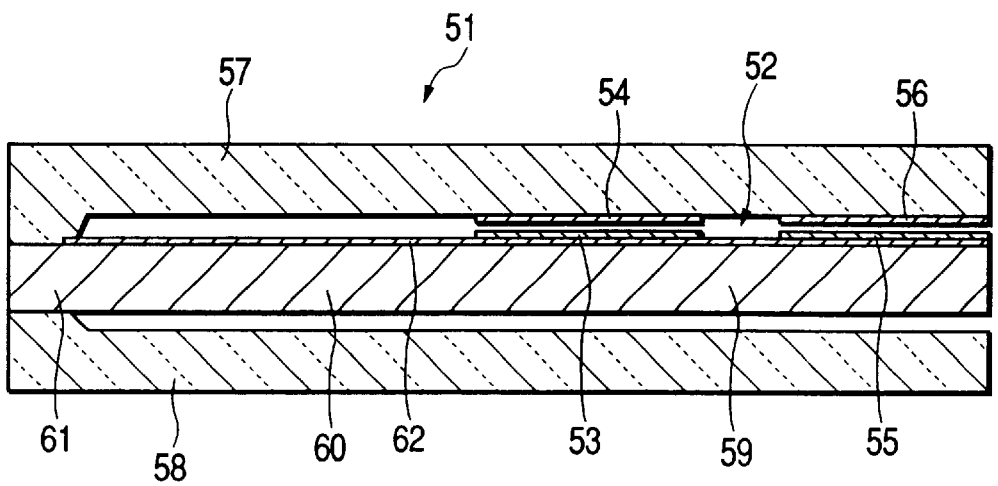
FIG. 17 is a side cross sectional view along the line XVII—XVII of FIG. 16.
Figure 18:
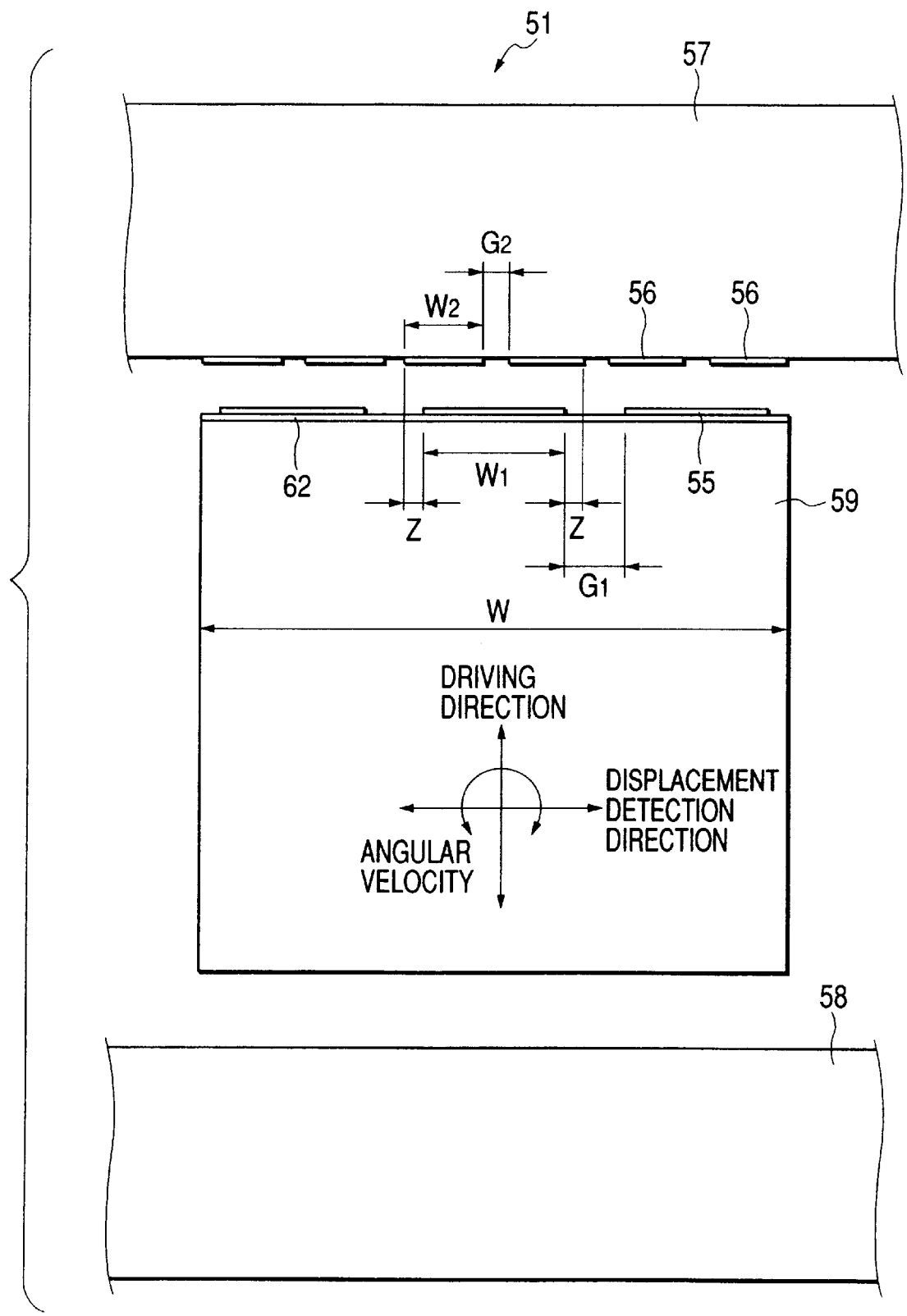
FIG. 18 is a side cross sectional view along the line XV—XV of FIG. 16 that is an enlarged view illustrating the electrode structure of one leg.

FIG. 15 is an exploded perspective view illustrating the whole structure of a gyroscope of the present embodiment, FIG. 16 is a plan view (showing the electrode structure on the bottom surface of the top side glass substrate), FIG. 17 is a cross sectional view along the line XVII—XVII of FIG. 16, FIG. 18 is a cross sectional view along the line XVII—XVII of FIG. 16 (enlarged view of one leg), and FIG. 19 is a process cross sectional view illustrating the fabrication process of a gyroscope. In these drawings, 52 denotes a tuning fork, 53 denotes a driving movable electrode, 54 denotes a driving fixed electrode, 55 denotes a detection movable electrode, 56 denotes a detection fixed electrode, 57 denotes a top side glass substrate (base material), and 58 denotes a bottom side glass substrate.

The gyroscope 51 of the present invention is provided with a three-leg tuning fork 52 comprising three legs 59 (vibration member) and a support 60 that connects base end sides of these three legs 59. A frame 61 is provided aside from the tuning fork 52. The tuning fork 52 and the frame 61 are formed of a conductive single silicon substrate having a thickness of approximately 200 μm. As shown in FIG. 17, the frame 61 is fixed between the top side glass substrate 57 and the bottom glass substrate 58, pits 57a and 58a having a depth of approximately 10 μm are formed on the respective inside surfaces of the two glass substrates 57 and 58 on the areas above and under the tuning fork 52 respectively. Thereby, gaps having a distance of approximately 10 μm are formed between the glass substrates 57 and 58 and the tuning fork 52, the gaps allow the legs 59 of the tuning fork 52 to vibrate.

As shown in FIG. 15 and FIG. 16, a driving movable electrode 53 that extends in the longitudinal direction of a leg 59 is provided on the top surface of each leg 59 at the base end side. Though not shown in FIG. 15 for easy understanding of FIG. 15, a driving movable electrode 53 is formed with interposition of an insulative film 62 consisting of silicon oxide film or the like having a thickness of approximately 500 nm formed on a silicon substrate as shown in FIG. 17.

On the other hand, a driving fixed electrode 54 that extends in the longitudinal direction of a leg 59 is provided on each leg 59 at the position that faces to the above-mentioned driving movable electrode 53 formed on the bottom surface of the top side glass substrate 57. A driving movable electrode 53 and a driving fixed electrode 54 are formed of an aluminum film, chromium film, platinum/titanium film or the like having a thickness of approximately 300 nm. Wirings 63 and 64 served for supplying the driving signal to these electrodes 53 and 54 consisting of the same layer as that of the electrodes 53 and 54 such as aluminum film, chromium film or the like are formed monolithically with these electrodes 53 and 54.

Three detection movable electrodes 55 that extend in the longitudinal direction of a leg 59 are provided on the top surface of each leg 59 at the position on the free end side of the leg 59 with respect to the position of a driving movable electrode 53. These three detection movable electrodes 55, like the driving movable electrodes 53, are formed of aluminum film, chromium film or the like having a thickness of approximately 300 nm like the driving electrode, and formed with interposition of an insulative film 62 consisting of silicon oxide film formed on the silicon substrate. Furthermore, these three detection movable electrodes 55 are connected to each other in parallel, and a wiring 65 for leading out the detection signal is formed.

On the other hand, the detection fixed electrodes 56, wherein two detection fixed electrodes 56 (pair) for each detection movable electrodes 55 and six detection fixed electrodes 56 (three pairs) for each leg, are formed on the bottom surface of the top side glass substrate 57 at the position on the free end side of a leg 59 with respect to the position of the driving fixed electrode 54 so as to face to each detection movable electrode 55. The six detection fixed electrodes 56 for one leg 59 are connected in parallel every other detection fixed electrode, and a wiring 66a and a wiring 66b for leading out the detection signal are extended from the two parallel connected series respectively. In other words, in the present embodiment, the detection fixed electrodes 56 side comprises the two electrode groups, the number of electrodes (three) of each electrode group of the detection fixed electrode 56 is equal to the number of electrodes (three) of the detection movable electrodes 55, and the electrodes in each electrode group of the detection fixed electrode 56 are connected to each other in parallel.

As shown in FIG. 18, though the detection movable electrodes 55 on each leg 59 and one pair of detection fixed electrodes 56 on the top side glass substrate 57 are disposed so as to face each other, but both outer ends of the detection movable electrodes 55 in the displacement detection direction of the leg 59. (right end and left end in FIG. 18) are disposed so as to face not exactly to each outer end of one pair of detection fixed electrodes 56, and the outer end of each electrode of the one pair of detection fixed electrodes 56 deviates outside from both outer ends of each detection movable electrodes 55 by a distance equal to or larger than the maximum amplitude of the leg 59. Furthermore, the width W1 of each detection movable electrode 55 and the width W2 of each detection fixed electrode 56 are designed to be equal to or larger than the maximum amplitude of the leg 59.

A set of the exemplary dimension of these components is shown herein under. The width W of one leg 59 is 200 μm, the width W1 of each detection movable electrode 55 is 35 μm, a gap G1 between detection movable electrodes 55 is 15 μm, the width W2 of each detection fixed electrode 56 is 20 μm, a gap G2 between detection fixed electrodes 56 is 5 μm, and the deviation magnitude Z of each outer end of one pair of detection fixed electrodes 56 from each outer end of the detection movable electrode 55 is 5 μm. The maximum amplitude in the displacement detection direction of the leg 59 is designed to be 1 μm. In the present embodiment, the deviation magnitude of the outer end of the one detection fixed electrode 56 out of one pair of detection fixed electrodes 56 from the outer end of the detection movable electrode 55 is equal to the deviation magnitude of the outer end of the other detection fixed electrode 56 from the outer end of the detection movable electrode 55, but these deviation magnitudes may not be equal to each other as long as the deviation magnitudes are equal to or larger than the maximum amplitude of the leg 59.

The potential equalization pattern consisting of the same aluminum film, chromium film or the like as that of the driving fixed electrode 54 and the detection fixed electrode 56 is provided on the inner surface side of the top glass substrate 57 and on the inner surface side of the bottom glass substrate 58 on the area where the driving fixed electrode 54 and the detection fixed electrode 56 are provided actually. The potential equalization pattern is not necessary for function of the gyroscope 51, but it is necessary for the purpose of fabrication, and it is therefore not shown in the drawing.

Next, an exemplary method for fabrication of a gyroscope 51 having the structure described hereinabove will be described.

Figure 19A:
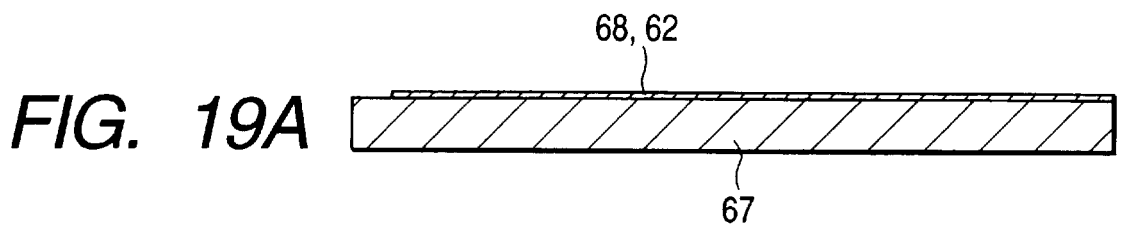
FIGS. 19A–19E are process cross sectional views sequentially illustrating the fabrication process of the gyroscope illustrated in FIG. 1.

As shown in FIG. 19A, a silicon substrate 67 is prepared, a silicon oxide film 68 is formed on the top surface of the silicon substrate 67 by means of thermal oxidation method or TEOS-CVD method, and the silicon oxide film 68 is patterned by means of well known photolithography so that the silicon oxide film 68 on the area where the frame 61, which is to be connected to the top glass substrate 57, is to be formed is removed. The silicon oxide film 68 functions as the insulative film 62 for electrically insulating the conductive silicon and the electrodes formed on the silicon oxide film 68 in-between.

Figure 19B:
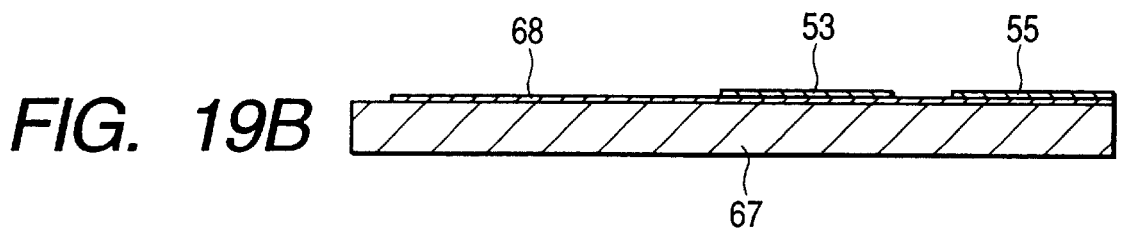

Next, as shown in FIG. 19B, aluminum film, chromium film, platinum/titanium film or the like having a thickness of approximately 300 nm is formed on the entire top surface of the silicon substrate 67 including on the surface of the silicone oxide film 68 by means of spattering, and then the formed film is patterned by means of well known photolithography technique to form the driving movable electrode 53 and the detection movable electrode 55 at the predetermined position on the top surface of the silicon substrate 67.

Separately, two glass substrates are prepared, chromium film is formed on the surface by means of spattering, a resist pattern is formed, and the chromium film is etched with aid of the resist pattern as a mask, though the process is not shown in the drawing. Next, the glass substrate surface is subjected to hydrofluoric acid etching with aid of the resist pattern and chromium film as a mask to form a pit having a depth of approximately 10 $\mu$m on the area of the glass substrate corresponding to the position of the tuning fork. Subsequently, the resist pattern and the chromium pattern are removed. Next, one glass substrate is processed as described herein under. In detail, aluminum film, chromium film, platinum/titanium film or the like having a thickness of approximately 300 nm is formed on the entire surface of the glass substrate by means of spattering, the formed film is patterned by means of well known photolithography technique to form the driving fixed electrode 54, detection fixed electrode 56, and potential equalization pattern, and this substrate is used as the top side glass substrate 57. Similarly, the other glass substrate is processed as described herein under. In detail, aluminum film, chromium film or the like is formed on the entire surface of the glass substrate by means of spattering, the formed film is patterned to form the potential equalization pattern, and this glass substrate is used as the bottom side glass substrate 58.

Figure 19C:
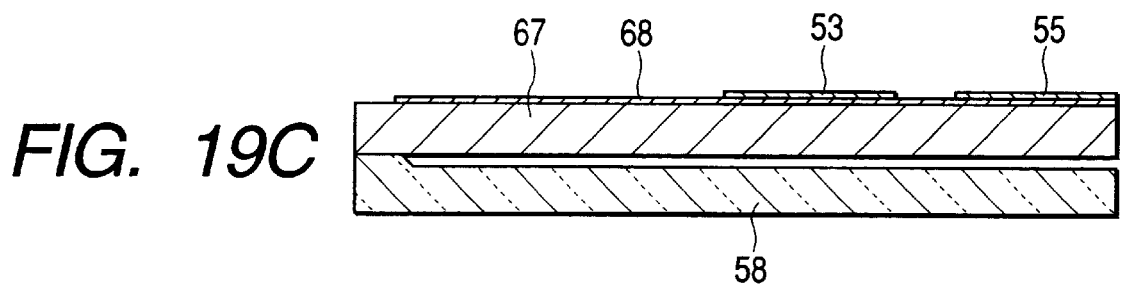

Next, as shown in FIG. 19C, the bottom surface of the silicon substrate 67 and the bottom side glass substrate 58 are bonded together by means of anodic bonding method. At that time, the area that is to be served as the frame 61 of the silicon substrate 67 is bonded. The positive potential is applied to the silicon substrate and the negative potential is applied to the glass substrate to bond between the silicon and glass in the anodic bonding method. At that time, because the gap between the silicon substrate 67 and the bottom side glass substrate 58 surface is only approximately 10 $\mu$m on the area that is to be served as the tuning fork 52, the silicon substrate 67 could be bent by electrostatic attractive force to result in contact with the bottom side glass substrate 58 and to result in bonding each other, and as the result a tuning fork 52 that can vibrate cannot be formed. In view of the above, to prevent bonding of the portion that is not to be bonded with the bottom side glass substrate 58, the potential equalization pattern on the bottom side glass substrate 58 surface is used so that the potential of the bottom glass substrate 58 surface and the potential of the silicon substrate 57 are equalized to each other. That is true for the top side glass substrate 57.

Figure 19D:
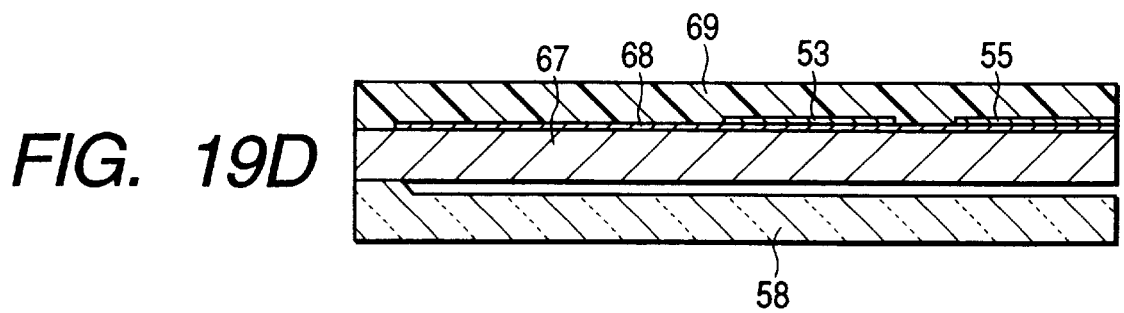
Figure 19E:
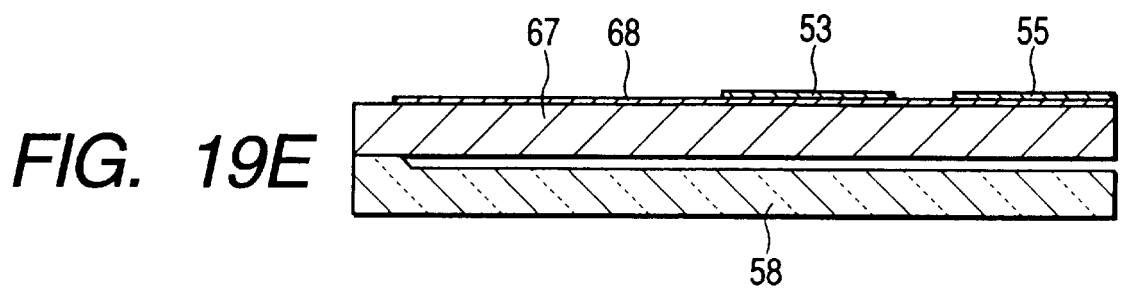

Next, as shown in FIG. 19D, a resist pattern 69 is formed on the silicon substrate 67 surface. At that time, the planer shape of the resist pattern 69 is the shape of the tuning fork 52 and frame 61 as shown in FIG. 16 where the silicon will remains. The silicon substrate 67 is subjected to anisotropic etching such as reactive ion etching with aid of the resist pattern 69 as a mask so as to be penetrated through the thickness. Thereby, the tuning fork 52 and the frame 61 are formed, the tuning fork 52 is free from contact with the bottom side glass substrate 58. Subsequently, the resist pattern 69 is removed and the semi-finished product as shown in FIG. 19E is obtained.

Next, the top surface of the silicon substrate 67 that has been bonded with the bottom side glass substrate 58 is bonded with the top side glass substrate 57 by means of anodic bonding method. At that time, the frame 61 of the silicon substrate 67 is bonded with the top side glass substrate 57 as shown in FIG. 17. Through the above-mentioned process, the gyroscope 51 of the present embodiment is completed.

When the gyroscope 51 of the present embodiment is used, an oscillator that is served as a driving source is connected between the wiring 63 of the driving movable electrode 53 and the wiring 64 of the driving fixed electrode 54, the first capacitance detector is connected between the wiring 65 of the detection movable electrode 55 and the wiring 66a of the one detection fixed electrode 56, the second capacitance detector is connected between the wiring 65 of the detection movable electrode 55 and the wiring 66b of the other detection fixed electrode 56, and the tuning fork 52. is grounded. When the oscillator is driven to apply a voltage having a frequency of several kHz between the driving movable electrode 53 and the driving fixed electrode,54, the leg 59 of the tuning fork 52 is vibrated in the vertical direction. When an angular velocity is entered round the rotation axis in the longitudinal direction of the leg 59 in this state, vibration in the horizontal direction is caused depending on the magnitude of the entered angular velocity. At that time, because the detection movable electrode 55 of each leg 59 of the tuning fork 52 is facing to thee detection fixed electrode 56 of the top side glass substrate 57, the facing area between the detection movable electrode 55 and the detection fixed electrode 56 changes concomitantly with the horizontal vibration of the leg 59 to thereby cause the capacitance change. The capacitance change is differentially detected by means of the first capacitance detector and the second capacitance detector, and the magnitude of the angular velocity can be detected thereby.

Therefore, it is not necessary to provide detection electrodes between a leg and a leg in the gyroscope 51 of the present embodiment unlike the conventional gyroscope. As the result, the inter-leg gap can be minimized up to the approximate working limit of the silicon substrate, for example, several tens μm, and Q-value is increased. For example, in the case of a gyroscope having legs with a width of 200 μm, if the inter-leg gap is 300 μm to 400 μm, then the Q-value is around 1000, but if the inter-leg gap is several tens μm, then the Q-value is around 2000, namely approximately double value. The increased Q-value brings about the improved detection sensitivity of an angular velocity sensor and reduced driving voltage. Furthermore, the device can be miniaturized.

The applicant of the present invention has already applied for a patent for a gyroscope having another structure for achieving the object of the present invention. The gyroscope of the present invention is the improved version of the gyroscope disclosed in the previous patent application, and is advantageous over the gyroscope of the previous patent application in the following points.

The gyroscope 21 shown in FIG. 13 and FIG. 14 is different from the gyroscope 51 of the above-mentioned embodiment in that two detection fixed electrodes 6 are provided for each leg 9 on the bottom surface of the top side glass substrate 7. Furthermore, because the leg 9 itself consisting of conductive silicon is served for functioning as the electrode, neither the driving electrode nor the detection electrode is provided on the leg 9.

Figure 29:
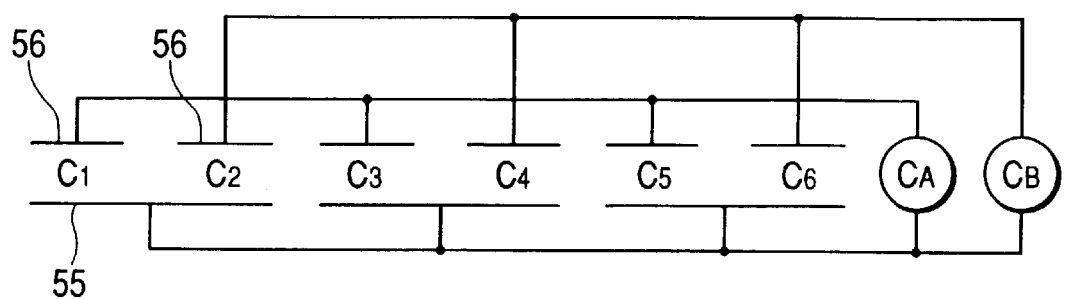
FIG. 29 is an equivalent circuit diagram illustrating the structure of the gyroscope of the fifth embodiment.

On the other hand, in the case of the gyroscope 51 of the present embodiment, three detection movable electrodes 55 and six detection fixed electrodes 56 are provided for each leg 59, and a pair of two detection fixed electrodes 56 are disposed so as to face to one detection movable electrode 55. The three detection movable electrodes 55 are connected to each other in parallel, and the six detection fixed electrodes 56 are connected every other detection fixed electrode 56 respectively. This structure is shown in the form of an equivalent circuit diagram as shown in FIG. 29. Capacitances, each of which comprises the detection movable electrode 55 and detection fixed electrode 56 that are facing each other, are denoted by C1, C2, C3, C4, CS, and C6 respectively. The capacitance of one leg 59, at the time when the angular velocity is not entered to the leg 59, Coriolis force is not exerted, and the displacement is 0 (initial state), is denoted by Cdt1, then the Cdt1 is represented by the following equation.

$$Cdt1 = C1 + C2 + C3 + C4 + C5 + C6 \quad (6)$$

Next, the capacitance of one leg 59, at the time when the angular velocity is entered to the leg 59, Coriolis force is exerted to cause some displacement, is denoted by Cdt2, then the Cdt2 is represented by the following equation because differential detection is carried out in the gyroscope 51 of the present embodiment.

$$Cdt2 = \{(C1+\Delta C1)+(C3+\Delta C3)+(C5+\Delta C5)\} - \{(C2+\Delta C2)+(C4'\Delta C4)+(C6+\Delta C6)\} \quad (7)$$

(wherein ΔC1, ΔC2; . . . , ΔC6 are capacitance change magnitude of each capacitance)

In FIG. 29, the first term {(C1'ΔC1)+(C3+ΔC3)+(C5+ΔC5)} of the equation (7) is measured by means of the capacitance detector $C_A$, and the second term {(C2+ΔC2)+(C4+ΔC4)+(C6+ΔC6)} of the equation (7) is measured by means of the capacitance detector $C_B$.

The equation (7) is transformed to obtain the equation (8) described herein under.

[Formula 3]

$$C_{dt2} = \left\{ \sum_{i(odd\ number)} (Ci + \Delta Ci) \right\} - \left\{ \sum_{i(even\ number)} (C_i + \Delta Ci) \right\} \quad (8)$$
$$= \sum_{i=1} \Delta Ci$$

In one exemplary case, Cdt1 is approximately 1 pF and ΔCi is in a range from 0.01 to 0.1 pF.

In the case of the gyroscope 21 of the previous patent application shown in FIG. 13 and FIG. 14, because two detection electrodes 6 are provided for one leg 9, n in the equation (8) is 2, and for example, the capacitance change magnitude for one leg is approximately 0.02 to 0.2 pF. On the other hand, in the case of the gyroscope 51 of the present embodiment, n in the equation (8) is 6, then the capacitance change magnitude is, for example, approximately 0.06 to 0.6 pF. Therefore, when a leg 59 is subjected to the same magnitude of angular velocity to cause the same magnitude of displacement, the capacity change of the gyroscope 51 of the present embodiment is three times larger than that of the gyroscope 21 of the previous patent application. Therefore, n detection electrodes provided for one leg functions to improve the sensitivity (n/2) times in comparison with the gyroscope 21 of the previous patent application. As described hereinabove, according to the gyroscope 51 of the present invention, the detection sensitivity is improved the more.

Furthermore, though differential detection is applied in the present embodiment, because the sums of the every other initial capacitance value are equal to each other (C1+C3+C5=C2+C4+C6) as shown in the equation (8), the initial capacitance value is eliminated, and only the capacitance change magnitude remains. Therefore, because noise component included in the initial capacitance value can be canceled, the detection accuracy is improved.

In the gyroscope 51 of the present embodiment, because the tuning fork 52 is interposed between the glass substrates 57 and 58, the tuning fork 52 is protected by the glass substrates 57 and 58, and the gyroscope 51 is therefore easily handled. Furthermore, because the dust is prevented from entering to the tuning fork 52, the disturbance is suppressed, and the sensor accuracy is improved. The structure is acceptable of vaccum package, and the Q-value is improved the more thereby. Furthermore, in the case of the present embodiment, the detection fixed electrode 56 side comprises two electrode groups, the number of electrodes (three) of each electrode group of the detection fixed electrode 56 is equal to the number of electrodes (three) of the detection movable electrode 55, and two detection fixed electrodes that belong to two electrode groups respectively are faced to one detection movable electrode, 55 to form a pair. Thereby, the width of the vibration member can be used most effectively.

Sixth Embodiment

The sixth embodiment of the present invention will be described with reference to FIG. 20.

Figure 20:
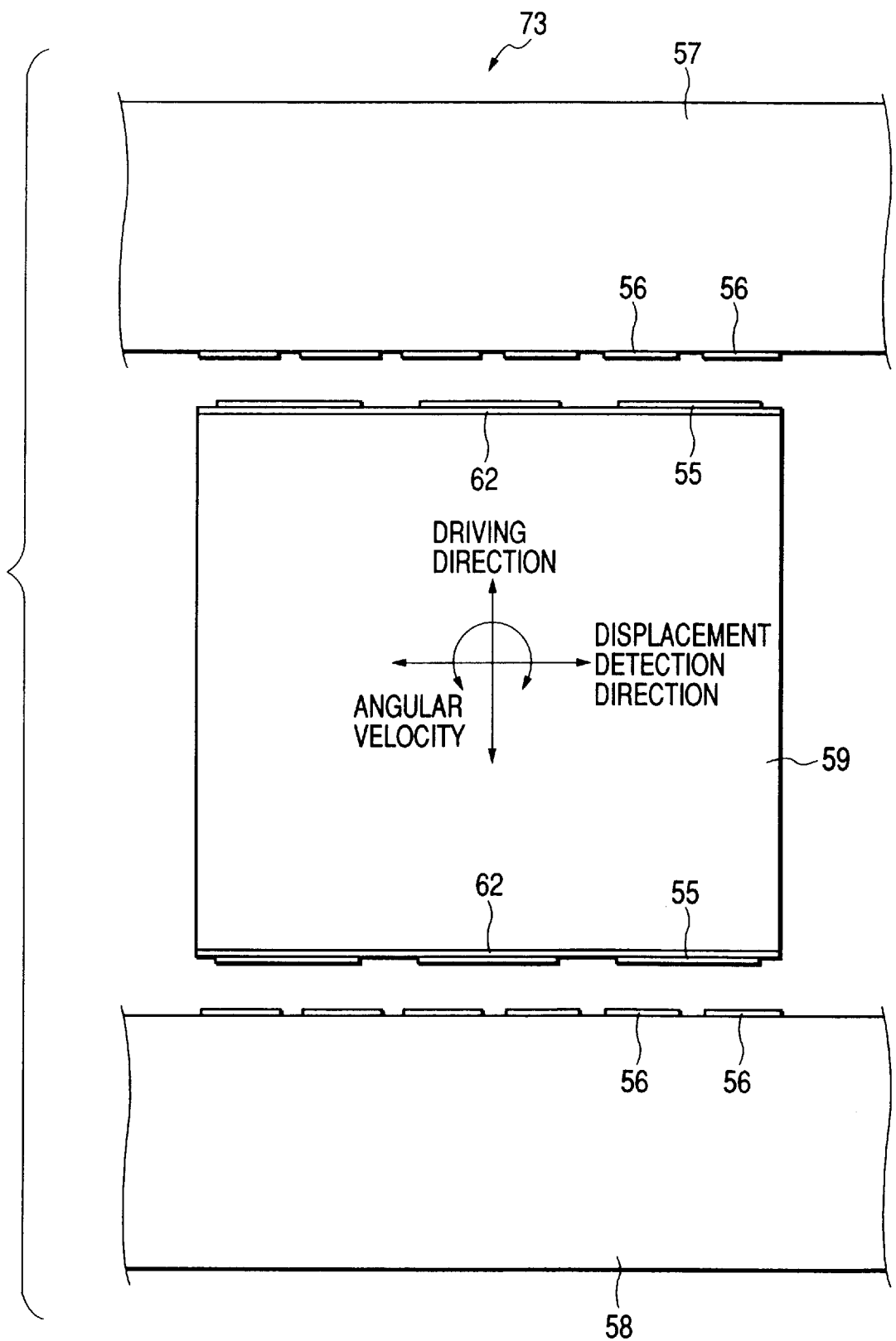
FIG. 20 is an enlarged view illustrating the electrode structure of one leg of a gyroscope of the sixth embodiment of the present invention.

FIG. 20 is an enlarged view illustrating the electrode structure of one leg of a gyroscope of the present embodiment. The basic structure of the gyroscope of the present embodiment is quite the same as that of the fifth embodiment, but the gyroscope of the present embodiment is different from that of the fifth embodiment only in the electrode structure for one leg. The common components shown in FIG. 20 to those shown in FIG. 18 are given the same characters, and only the different components are described and the description of the common components is omitted.

The detection movable electrodes 57 and the detection fixed electrodes 56 are provided on the top surface of legs 59 and the bottom surface of the top side glass substrate 57 respectively in the fifth embodiment, on the other hand in the case of the gyroscope 73 of the present embodiment, the same electrodes are provided also on the top surface of the bottom side glass substrate 58 and the bottom surface of each leg 59. In detail, as shown in FIG. 20, three detection movable electrodes 55 are provided for each leg 59 on the bottom surface of the leg 59 at the position near the free end so as to extend in the longitudinal direction of the leg 59. The three detection movable electrodes 55 consist of aluminum film, chromium film, platinum/titanium film or the like having a thickness of approximately 300 nm like the electrodes on the top surface side of the leg 59, and formed with interposition of an insulative film 62 consisting of silicon oxide film or the like. Furthermore, the three detection movable electrodes 55 are connected in parallel to each other, and furthermore a wiring for leading out the detection signal is formed.

On the other hand, on the top surface of the bottom glass substrate 58, the detection fixed electrodes 56, two (one pair) are allocated to each detection movable electrode 55 and six (three pairs) are allocated to each leg 59, are provided so as to face to the detection movable electrodes 55. The six detection fixed electrodes 56 allocated to one leg are connected every other detection fixed electrode 56 in parallel, and wirings served for leading out the detection signal are extended from the two series connected in parallel. As for the detection electrodes, the outer end of each electrode that constitutes one pair of detection fixed electrodes is disposed so as to deviate outside from both outer ends of each detection movable electrode 55 by a distance equal to or larger than the maximum amplitude of the leg 59. The width of each detection movable electrode 55 and the width of each detection fixed electrode 56 are designed to be equal to or larger than the maximum amplitude of the leg.

Also in the case of the gyroscope 73 of the present invention, the Q-value can be increased because the detection electrodes between the legs 59 are eliminated. As the result, the same effect, such as improvement of the detection sensitivity of the angular velocity sensor, reduction of the driving voltage, and miniaturization of the device, as obtained by the first embodiment, can be obtained by applying the gyroscope 73 of the present embodiment.

Furthermore, as for the detection sensitivity, in the case of the present embodiment, the capacitances formed on the top surface side of the leg 59 and the capacitances formed on the bottom surface side of the leg 59 are connected in parallel and total twelve capacitances are formed resultantly for one leg 59, as the result the sensitivity is two times larger than that of the gyroscope 51 of the fifth embodiment, and is six times larger than that of the gyroscope 21 of the previous patent application shown in FIG. 13 and FIG. 14.

Seventh Embodiment

The seventh embodiment will be described hereinafter with reference to FIG. 21.

Figure 21:
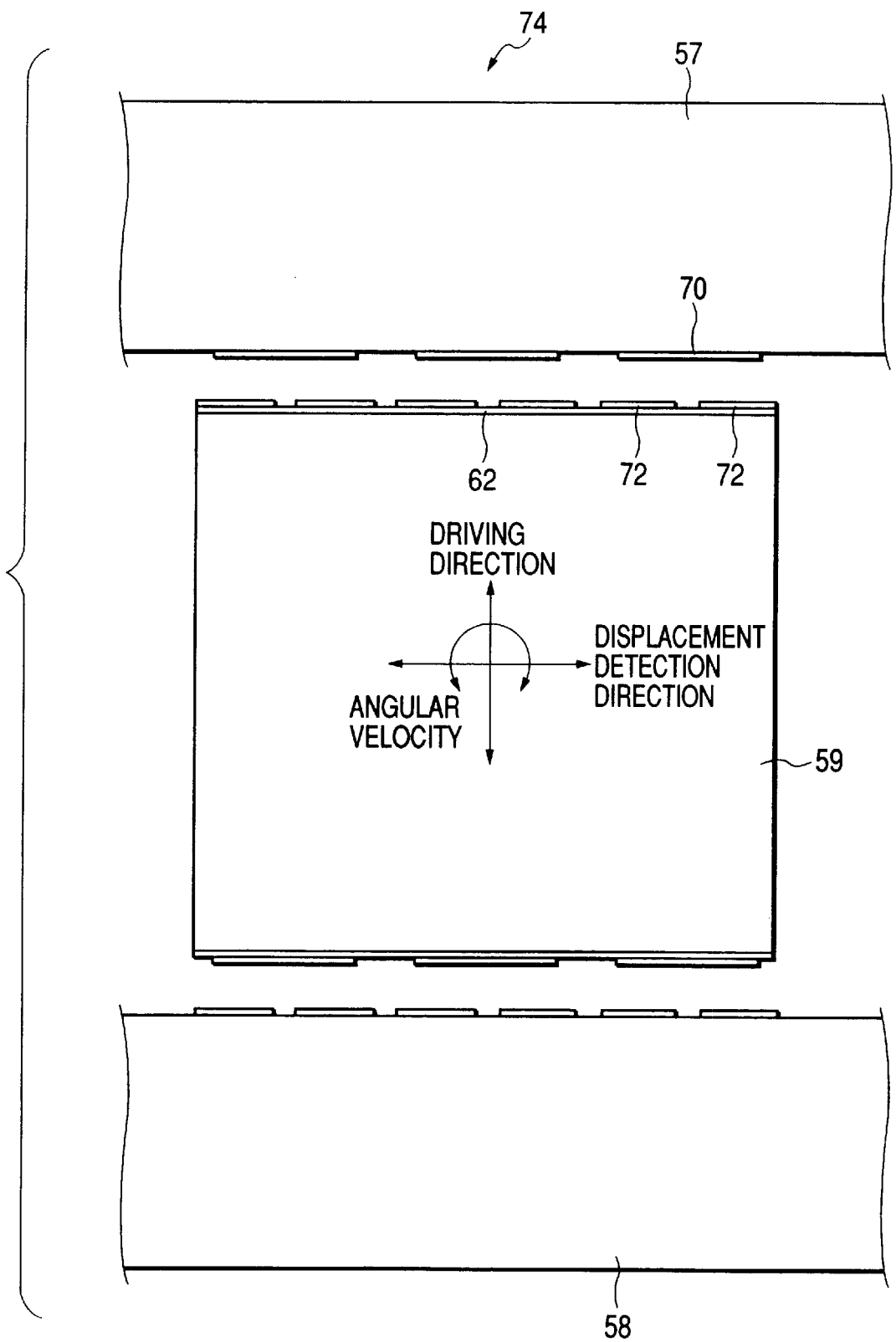
FIG. 21 is an enlarged view illustrating the electrode structure of one leg of a gyroscope of the seventh embodiment of the present invention.

FIG. 21 is an enlarged view illustrating one leg of a gyroscope of the present embodiment. The basic structure of the gyroscope of the present invention is quite the same as those of the fifth and sixth embodiments, but different only in the following point. One pair of two detection electrodes are provided on the glass substrate side for one detection electrode of the leg side in the above-mentioned fifth and sixth embodiments, on the other hand one pair of two detection electrodes are provided on the leg side for one detection electrode of the glass substrate side in the present embodiment. Hereinafter, the common components in FIG. 21 to those shown in FIG. 18 are given the same characters, and only the different components are described and the description of the common components is omitted.

As shown in FIG. 21, in the case of the gyroscope 74 of the present embodiment, three detection fixed electrode 70 are provided on the bottom surface of the top side glass substrate 57 for each leg 59 at the position on the free end side of the leg 59 so as to extend in the longitudinal direction of the leg 59. These three detection fixed electrode 70 are formed of aluminum film, chromium film, platinum/titanium film or the like having a thickness of approximately 300 nm. Furthermore, these three detection fixed electrodes 70 are connected to each other in parallel, and a wiring served for leading out the detection signal is formed.

On the other hand, on the top surface of the leg 59, the detection movable electrodes 72, two (one pair) are provided for each detection fixed electrode 70 and six (three pairs) are provided for each leg 59, are provided so as to face to the detection fixed electrodes 70. The six detection movable electrodes 72 for one leg are formed with interposition of an insulative film 62 formed of silicon oxide film or the like, every other three detection movable electrodes 72 are grouped into one electrode group, these electrodes that belong to the same electrode group are connected in parallel, and wirings served for leading out the detection signal are extended from the two series connected in parallel. Furthermore, the outer end of electrodes that constitute one pair of detection movable electrodes 72 is disposed so as to deviate outside from both outer ends. of the detection fixed electrode 70 by a distance equal to or larger than the amplitude of the leg 59. The width of each detection movable electrode 72 and the width of each detection fixed electrode 70 are designed to be equal to or larger than the maximum amplitude of the leg 59.

Also in the case of the gyroscope 74 of the present invention, the Q-value can be increased because the detection electrodes between the legs are eliminated. As the result, the same effect, such as improvement of the detection sensitivity of the angular velocity sensor, reduction of the driving voltage, and. miniaturization of the device, as obtained by the fifth and sixth embodiments, can be obtained by applying the gyroscope 74 of the present embodiment.

Eighth Embodiment

The eighth embodiment of the present invention will be described hereinafter with reference to FIG. 22.

Figure 22:
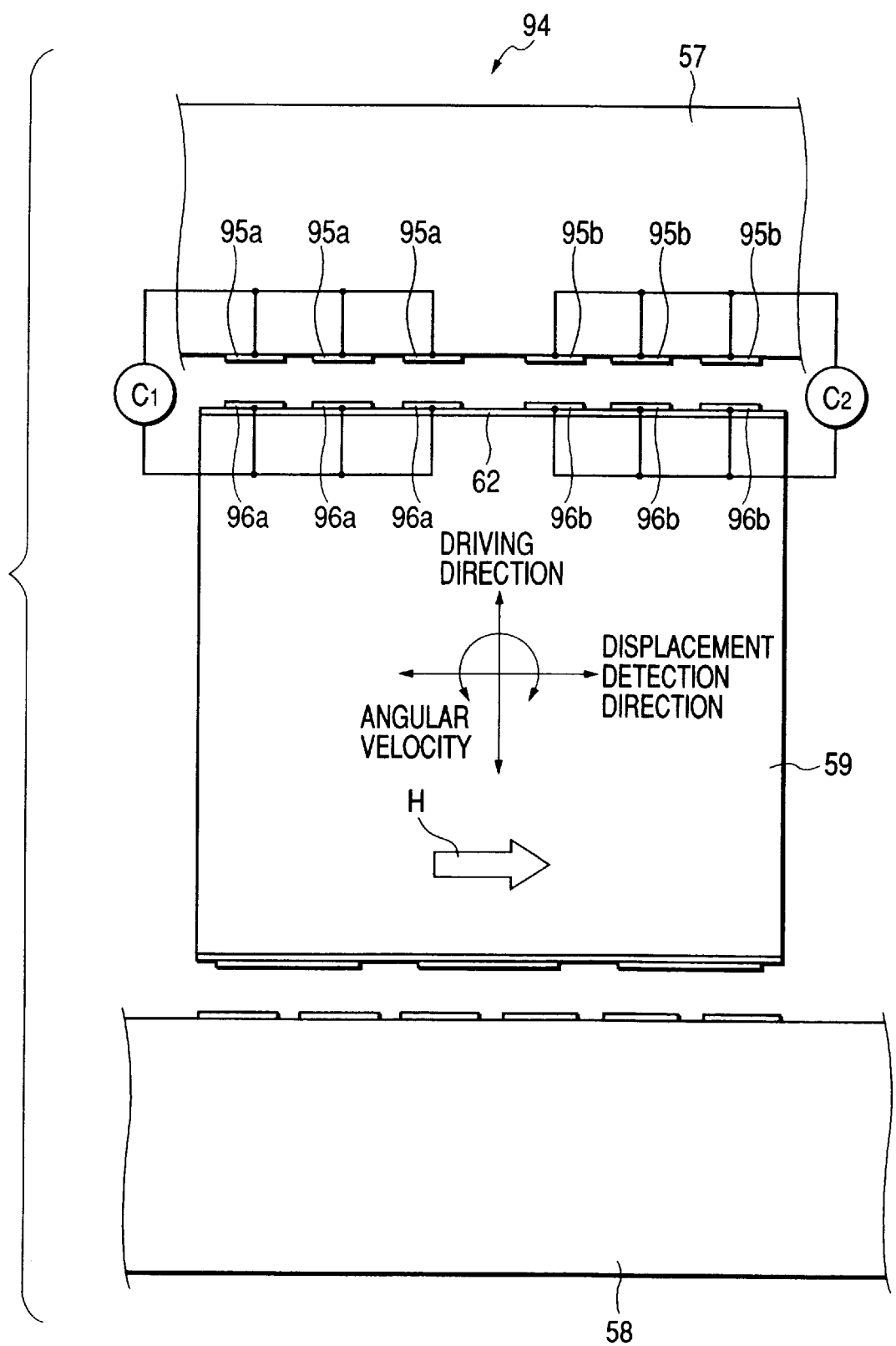
FIG. 22 is an enlarged view illustrating the electrode structure of one leg of a gyroscope of the eighth embodiment of the present invention.

FIG. 22 is an enlarged view illustrating the electrode structure of one leg of a gyroscope of the present embodiment. The basic structure of the gyroscope of the present invention is quite the same as those of the fifth to seventh embodiments, but different only in the following point. One detection electrode is provided on the leg side or the glass substrate side, and one pair, namely two, detection electrodes are provided on the other side, namely the glass substrate side or the leg side, so as to face to the above-mentioned one detection electrode provided on the one side in the above-mentioned fifth to seventh. embodiments. On the other hand, in the eighth and ninth embodiment that will be described hereinafter, the total number of detection fixed electrodes on the glass substrate side is equal to the total number of detection movable electrodes on the leg side, and the detection fixed electrode is one-to-one corresponding to the detection movable electrode. The eighth and ninth embodiments are different from the fifth to seventh embodiments in that point. Hereinafter, the common components shown in FIG. 22 to those shown in FIG. 21 for the seventh embodiment are given the same characters, and only the different components are described and the description of the common components is omitted.

As shown in FIG. 22, in the case of the gyroscope 94 of the present embodiment, six detection fixed electrodes 95a and 95b for each leg 59 are provided on the bottom surface of the top side glass substrate 57 at the position corresponding to the portion near the free end of the leg so as to extend in the longitudinal direction of the leg 59. These six detection fixed electrodes 95a and 95b are formed of aluminum film, chromium film, platinum/titanium film or the like having a thickness of approximately 300 nm. The left side three detection fixed electrodes 95a out of these six detection fixed electrodes 95a and 95b are connected to each other in parallel (the same electrode group), and the right side three detection fixed electrodes 95b out of these six detection fixed electrodes 95a and 95b are connected to each other in parallel (the same electrode group), and furthermore wirings (not shown in the drawing) served for leading out the detection signal are formed.

On the other hand, on the top surface of a leg 59, the detection movable electrodes 96a and 96b, one is provided for each detection fixed electrode 95a or 95b and six are provided for each leg 59, are provided so as to face to the detection fixed electrodes 95a and 95b. The six detection movable electrodes 96a and 96b for one leg are formed with interposition of an insulative film 62 formed of silicon oxide film or the like. Out of these six detection movable electrodes 96a and 96b, the left side three detection movable electrodes 96a (the same electrode group) are connected to each other in parallel, and the right side three detection movable electrodes 96b (the same electrode group) are connected to each other in parallel, and wirings served for leading out the detection signal are extended from the two series connected in parallel. The outer ends of the left side three detection movable electrodes 96a are disposed so as to deviate to the left side (outside) from the outer ends of the left side three detection fixed electrodes 95a by a distance equal to or larger than the maximum amplitude of the leg 59. On the other hand, the outer ends of the right side three detection movable electrodes 96b are disposed so as to deviate to the right side (outside) from the outer ends. of the right side three detection fixed electrodes 95b by a distance equal to or larger than the maximum amplitude of the leg 59. The width of each detection movable electrode 96a or 96b and the width of each detection fixed electrode 95a or 95b are designed to be equal to or larger than the maximum amplitude of the leg 59.

When the gyroscope 94 of, the present embodiment. is used, the first capacitance detector C1 is connected between the wiring of the left side detection movable electrodes 96a and the wiring of the left side detection fixed electrodes 95a, and the second capacitance detector C2 is connected between the wiring of the right side detection movable electrodes 96b and the wiring of the right side detection fixed electrodes 95b. When the angular velocity round the rotation axis in the longitudinal direction of the leg 59 is entered while the legs 59 of the tuning fork 52 are being vibrated in the vertical direction, horizontal vibration corresponding to the magnitude of the entered angular velocity is caused. At that time, for example, when the leg 59 is displaced in the right direction with respect to the glass substrate 57 (in the direction shown with the arrow H in the drawing), the capacitance associated with the left side detection movable electrodes 96a and the left side detection fixed electrodes 95a increases and the capacitance change magnitude measured by the first capacitance detector C1 side exhibits positive, on the other hand the capacitance associated with the right side detection electrodes 96b and the right side detection fixed electrodes 95b decreases and the capacitance change magnitude measured by the second capacitance detector C2 side exhibits negative. These capacitance change magnitudes are detected differentially to thereby detect the magnitude of the angular velocity.

Also in the case of the gyroscope 94 of the present invention, the Q-value can be increased because the detection electrodes between the legs are eliminated. As the result, the same effect, such as improvement of the detection sensitivity of the angular velocity sensor, reduction of the driving voltage, and miniaturization of the device, as obtained by the fifth to seventh embodiments, can be obtained by applying the gyroscope 94 of the present embodiment.

In the present embodiment, the outer ends of the left side three detection movable electrodes 96a are disposed so as to deviate to the left side from the outer ends of the left side three detection fixed electrodes 95a, and the outer ends of the right side three detection movable electrodes 96b are disposed so as to deviate to the right side from the outer ends of the right side three detection fixed electrodes 95b. However otherwise, the deviation direction may be reversed. In detail, the outer ends of the left side three detection movable electrodes 96a are disposed so as to deviate to the right side from the outer ends of the left side detection fixed electrodes 95a, and the right side three detection movable electrodes 96b are disposed so as to deviate to the left side from the outer ends of the left side detection fixed electrodes 95b.

Ninth Embodiment

The ninth embodiment of the present invention will be described hereinafter with reference to FIG. 23.

Figure 23:
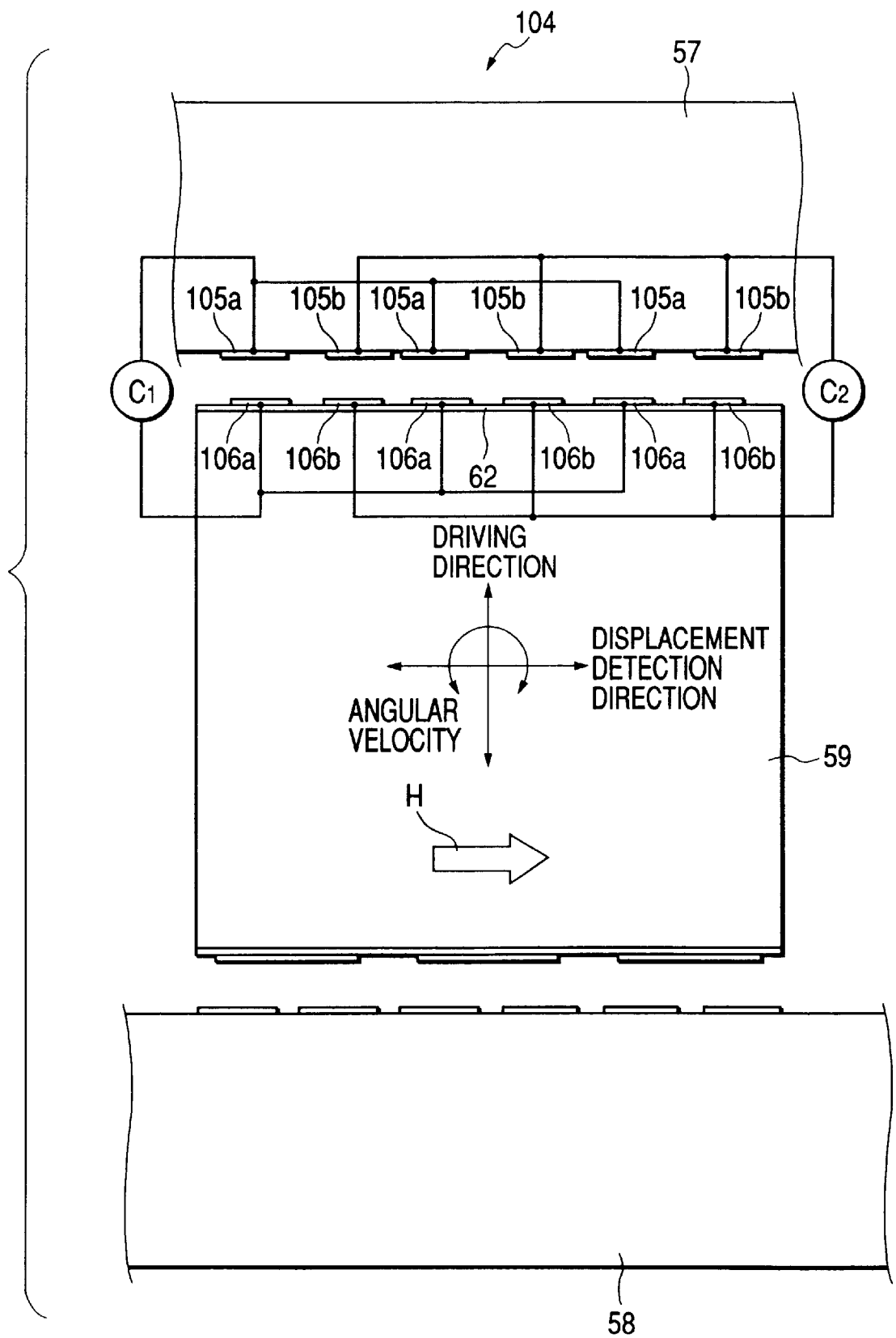
FIG. 23 is an enlarged view illustrating the electrode structure of one leg of a gyroscope of the ninth embodiment of the present invention.

FIG. 23 is an enlarged view illustrating the electrode structure of one leg of a gyroscope of the present embodiment. The basic structure of the gyroscope of the present invention is quite the same as those of the fifth to eighth embodiments, and the number of detection electrodes is the same as that in the eighth embodiment. The present embodiment is different from the eighth embodiment only in the positional relation between the detection fixed electrode and the detection movable electrode. Hereinafter, the common components shown in FIG. 23 to those shown in FIG. 22 for the eighth embodiment are given the same characters, and only the different components will be described and the description of the common components is omitted.

In the case of the gyroscope 104 of the present embodiment, six detection fixed electrodes 105a and 105b are provided for each leg 59 on the bottom surface of the top glass substrate 57 at the position corresponding to the portion near the free end of the leg 59 so as to extend in the longitudinal direction of the leg 59 as shown in FIG. 23. Out of these six detection fixed electrodes 105a and 105b, every other detection electrodes 105a are connected to each other in parallel (the same electrode group), and the other every other detection electrodes 105b are connected to each other in parallel (the same electrode group), and furthermore wirings (not shown in the drawing) served for leading out the detection signal are formed.

On the other hand, on the top surface of the leg 59, the detection movable electrodes 106a and 106b, one is provided for each detection fixed electrode 105a or 105b and six are provided for each leg 59, are provided so as to face to the detection fixed electrodes 105a and 105b. In the case of these six detection movable electrodes 106a and 106b, in the same manner as in the case of the detection fixed electrode, every other detection movable electrodes 106a are connected to each other in parallel (the same electrode group), and the other every other detection movable electrodes 106b are connected to each other in parallel (the same electrode group), and wirings (not shown in the drawing) served for leading out the detection signal are formed. The right ends of the detection movable electrodes 106a that are components of the one electrode group are disposed so as to deviate to the right side (outside) from the right ends of the detection fixed electrodes 105a that are facing to the detection movable electrodes 106a by a distance equal to or larger than the maximum amplitude of the leg 59, and on the other hand the left ends of the detection movable electrodes 106b that are components of the other electrode group are disposed so as to deviate to the left slide (outside) from the left ends of the detection fixed electrodes 105b that are facing to the detection movable electrodes 106b by a distance equal to or larger than the maximum amplitude of the leg 59. The width of the detection movable electrodes 106a and 106b and the width of the detection fixed electrodes 105a and 105b are designed to be equal to or larger than the maximum amplitude of the leg 59.

When the gyroscope 104 of the present embodiment is used, the first capacitance detector C1 is connected between the wiring of the detection movable electrodes 106a and the wiring of the detection fixed electrodes 105a, and the second capacitance detector C2 is connected between the wiring of the detection movable electrodes 106b and the wiring of the detection fixed electrodes 105b. When the angular velocity round the rotation axis in the longitudinal direction of the leg 59 is entered while the legs 59 of the tuning fork 52 are being vibrated in the vertical direction, horizontal vibration corresponding to the magnitude of the entered angular velocity is caused. At that time, for example, when the leg 59 is displaced in the right direction with respect to the glass substrate 57 (in the direction shown with the arrow H in the drawing), the capacitance associated with the detection movable electrodes 106a and the detection fixed electrodes 105a decreases and the capacitance change magnitude measured by the first capacitance detector C1 side exhibits negative, on the other hand the capacitance associated with the detection electrodes 106b and the detection fixed electrodes 105b increases and the capacitance change magnitude measured by the second capacitance detector C2 side exhibits positive. These capacitance change magnitudes are detected differentially to thereby detect the magnitude of the angular velocity.

Also in the case of the gyroscope 104 of the present invention, the Q-value can be increased because the detection electrodes between the legs are eliminated. As the result, the same effect, such as improvement of the detection sensitivity of the angular velocity sensor, reduction of the driving voltage, and miniaturization of the device, as obtained by the fifth to eighth embodiments, can be obtained by applying the gyroscope 104 of the present embodiment.

Tenth Embodiment

The tenth embodiment will be described hereinafter with reference to FIG. 24 to FIG. 26.

". . . provided on the surface parallel to the displacement detection direction of the free end of the above-mentioned vibration member . . . , a plurality of detection movable electrodes . . ." is described above in the present invention, wherein examples in which the detection movable electrodes are formed on the top surface or bottom surface of the leg out of "the surface parallel to the displacement detection direction" of the vibration member (leg) are exemplified in the first and second embodiments. On the other hand, in the present embodiment, an example in which detection movable electrodes are formed on the free end surface of the leg will be described.

Figure 24:
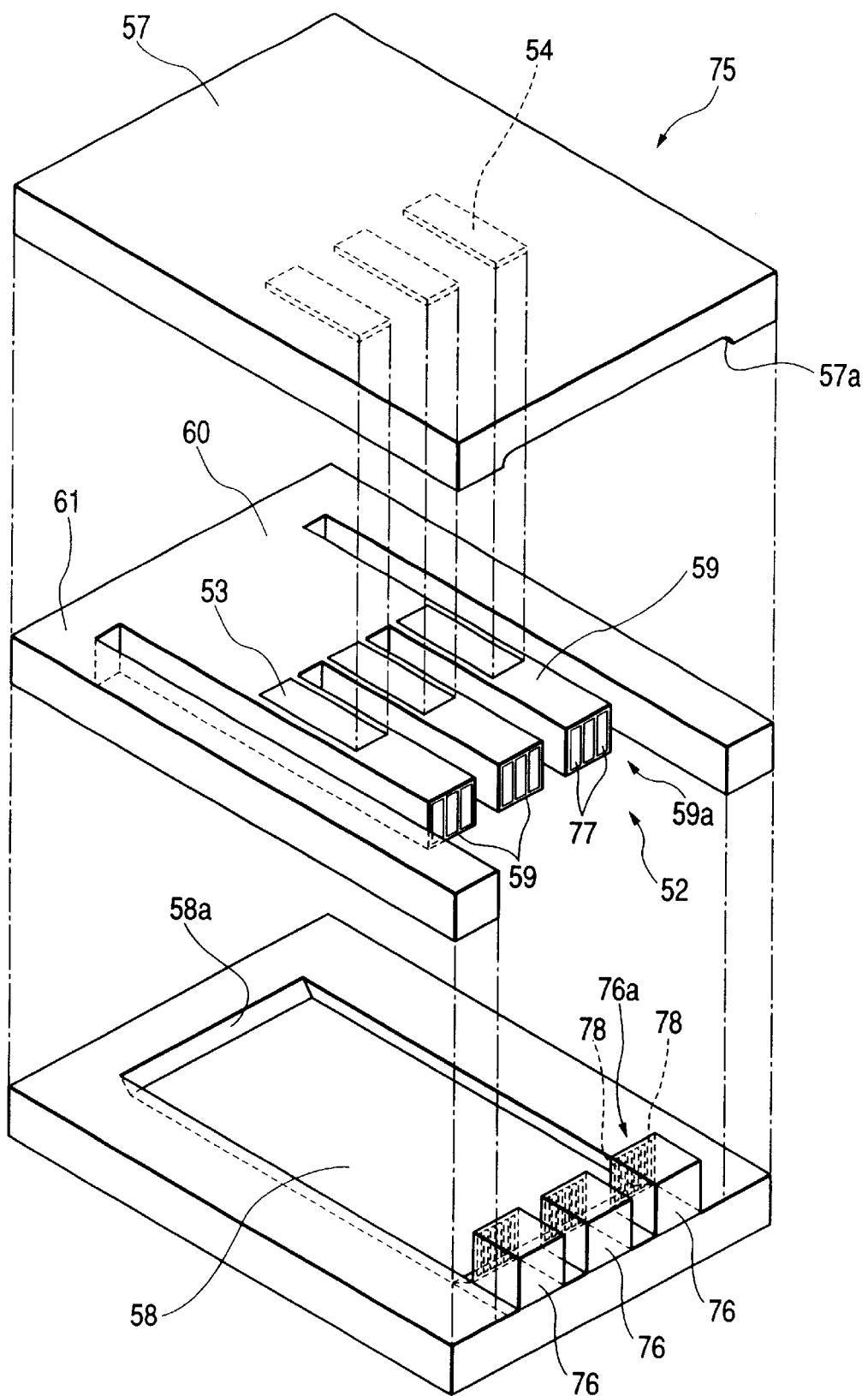
FIG. 24 is an exploded perspective view illustrating a gyroscope of the tenth embodiment of the present invention.
Figure 25:
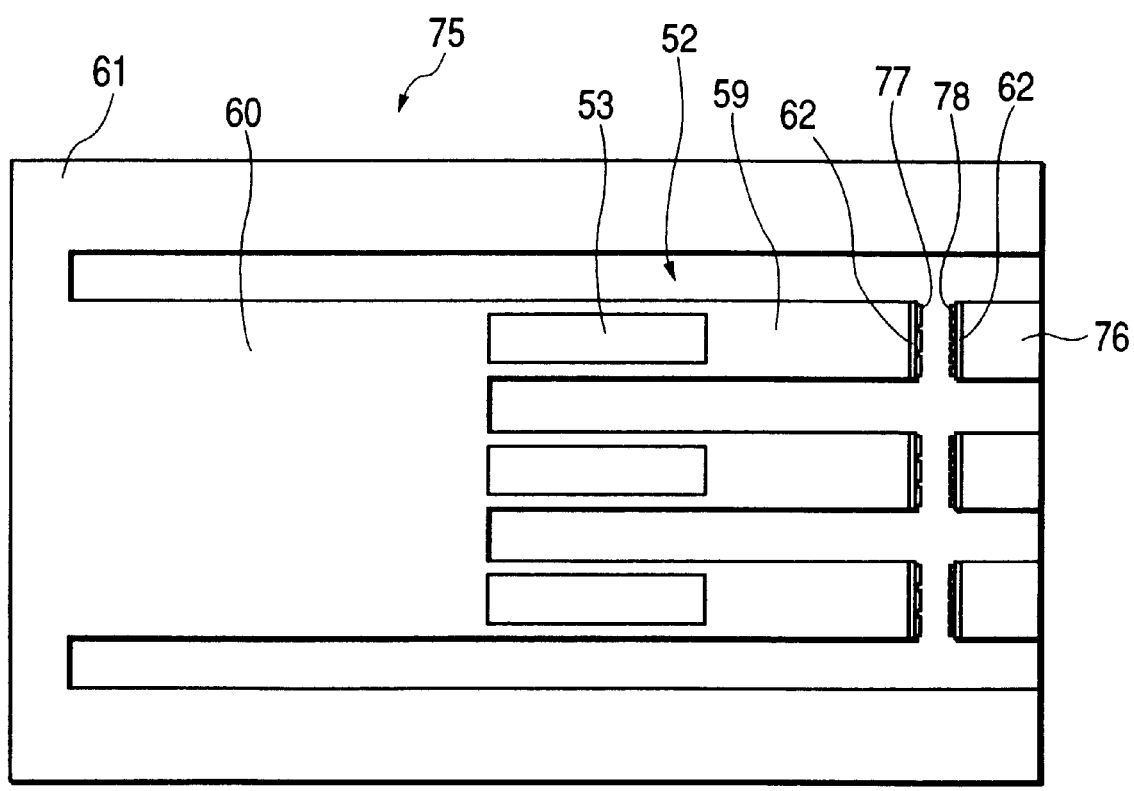
FIG. 25 is a plan view of the gyroscope illustrated in FIG. 24.

FIG. 24 is an exploded perspective view illustrating the whole structure of a gyroscope of the present embodiment, and FIG. 25 is a plan view. The present embodiment is different from the fifth to ninth embodiments in only the detection electrode structure. Therefore, the common components shown in FIG. 24 and FIG. 26 to those shown in FIG. 15 and FIG. 16 are given the same characters, and the detailed description of the common components is omitted.

Figure 26:
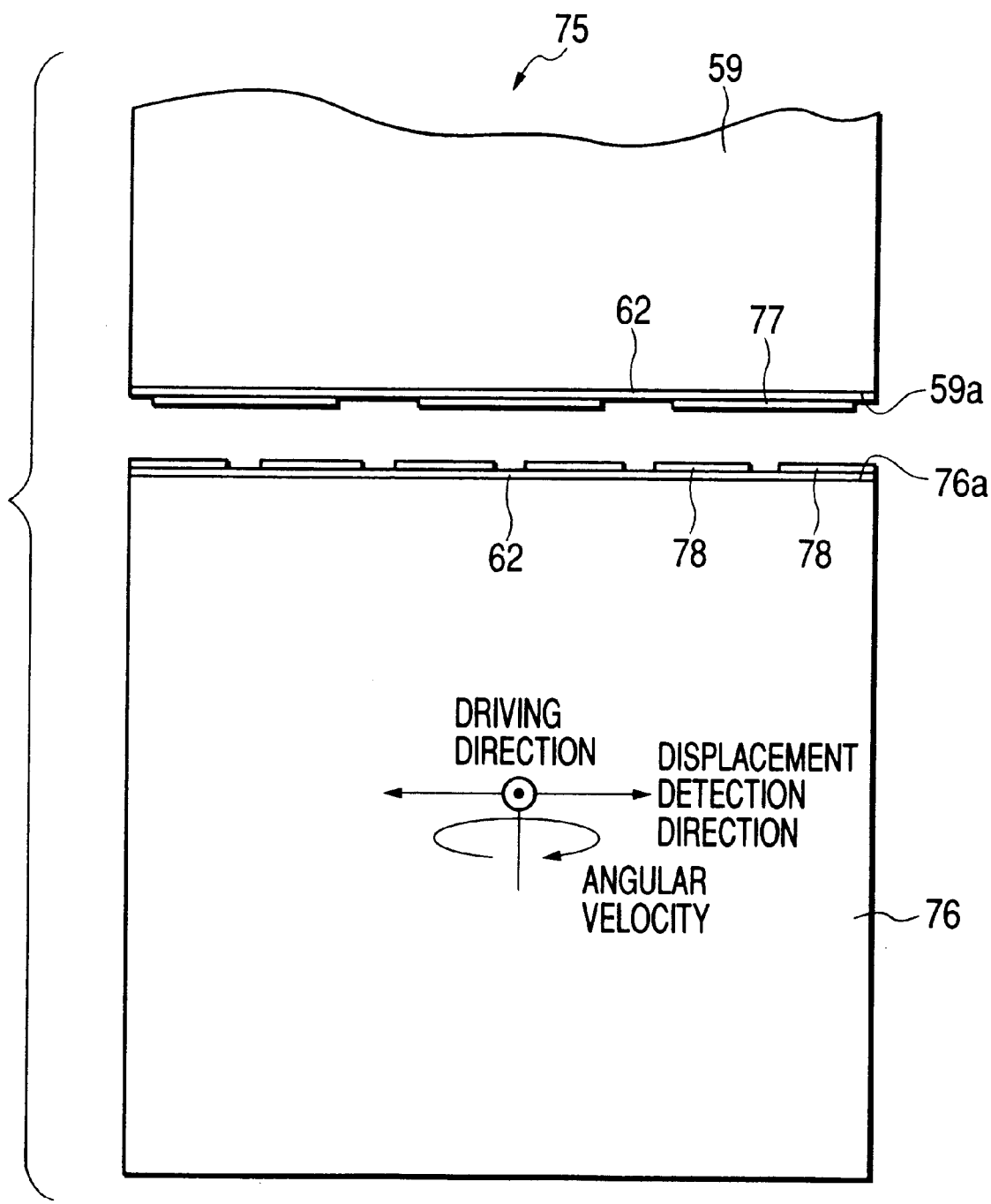
FIG. 26 is an enlarged view illustrating the electrode structure of one leg of a gyroscope of the tenth embodiment of the present invention.

As shown in FIG. 24 to FIG. 26, in the case of the gyroscope of the present embodiment, one detection electrode mounting member is fixed on the bottom side glass substrate 58 for each leg 59 so as to face to the free end surface 59a located in the extending direction of the leg 59. The areas of the respective surfaces of a leg 59 and a detection electrode mounting member 76 that are facing each other are the same. The detection electrode mounting member 76 is formed of a conductive single silicon substrate having a thickness of approximately 200 μm as well as the tuning fork 52 and the frame 61.

Three detection movable electrodes 57 are provided for each leg 59 on the free end surface 59a of the leg 59 so as to extend in the direction perpendicular to the displacement detection direction of the leg 59 namely in the vertical direction. The three detection movable electrodes 77 consist of aluminum film, chromium film our the like, and formed on the free end surface 59a of each leg with interposition of an insulative film 62 formed of silicon oxide film or the like. These three detection movable electrodes 77 are connected in parallel to each other.

On the other hand, on the surface 76a of the detection electrode mounting member 76 that is facing to the free end surface 59a of the leg 59, the detection fixed electrodes 78, two (one pair) are provided for each detection movable electrode 77 and six (three pairs) are provided for one leg, are provided so as to face to the detection movable electrodes 77. The six detection fixed electrodes 78 for one leg are connected every other detection fixed electrode 78 in parallel, and wirings (not shown in the drawing) served for leading out the detection signal are extended from the two series connected in parallel. The outer ends of electrodes that constitute one pair of detection fixed electrodes 78 are disposed so as to deviate outside from both outer ends of each detection movable electrode 77 by a distance equal to or larger than the maximum amplitude of the leg 59. The width of each detection movable electrode 77 and the width of each detection fixed electrode 78 are designed to be equal to or larger than the maximum amplitude of the leg 59. The structure of the driving electrode is the same as those of the fifth and sixth embodiments.

In the case of the gyroscope 75 of the present embodiment, because the vibration direction (displacement detection direction) of the leg 59 caused by Coriolis force when the angular velocity is entered is identical with the horizontal direction on the paper plane in FIG. 26, the facing area between a detection movable electrode 77 and the corresponding detection fixed electrode 78 changes concomitantly with the vibration of a leg 59 to cause the capacitance change. By detecting the capacitance change, the magnitude of the angular velocity can be detected.

Also in the case of the gyroscope 75 of the present embodiment, the Q-value can be increased because the detection electrodes located between legs 59 is eliminated. As the result, the same effect, such as improvement of the detection sensitivity of the angular velocity sensor, reduction of the driving voltage, and miniaturization of the device, as obtained by the fifth to ninth embodiments, can be obtained by applying the gyroscope 75 of the present embodiment. Furthermore, in the case of the present embodiment, the detection fixed electrode 78 and the tuning fork 52 are fabricated in the same process, and the interference between the detection fixed electrode 78 and the driving electrode is reduced.

Eleventh Embodiment

The eleventh embodiment will be described hereinafter with reference to FIG. 27.

The present embodiment presents an example in which the detection movable electrode is formed on the free end surface of the leg, and the detection fixed electrode is formed on the surface of detection electrode mounting member facing to the free end surface of the leg like the tenth embodiment. In the case of this structure, the number and, position of detection movable electrodes and the number and position of detection fixed electrodes may variously modified as in the case that the detection movable electrode is provided on the top surface/bottom surface of the leg. These variations will be described in the eleventh and twelfth embodiments briefly.

Figure 27:
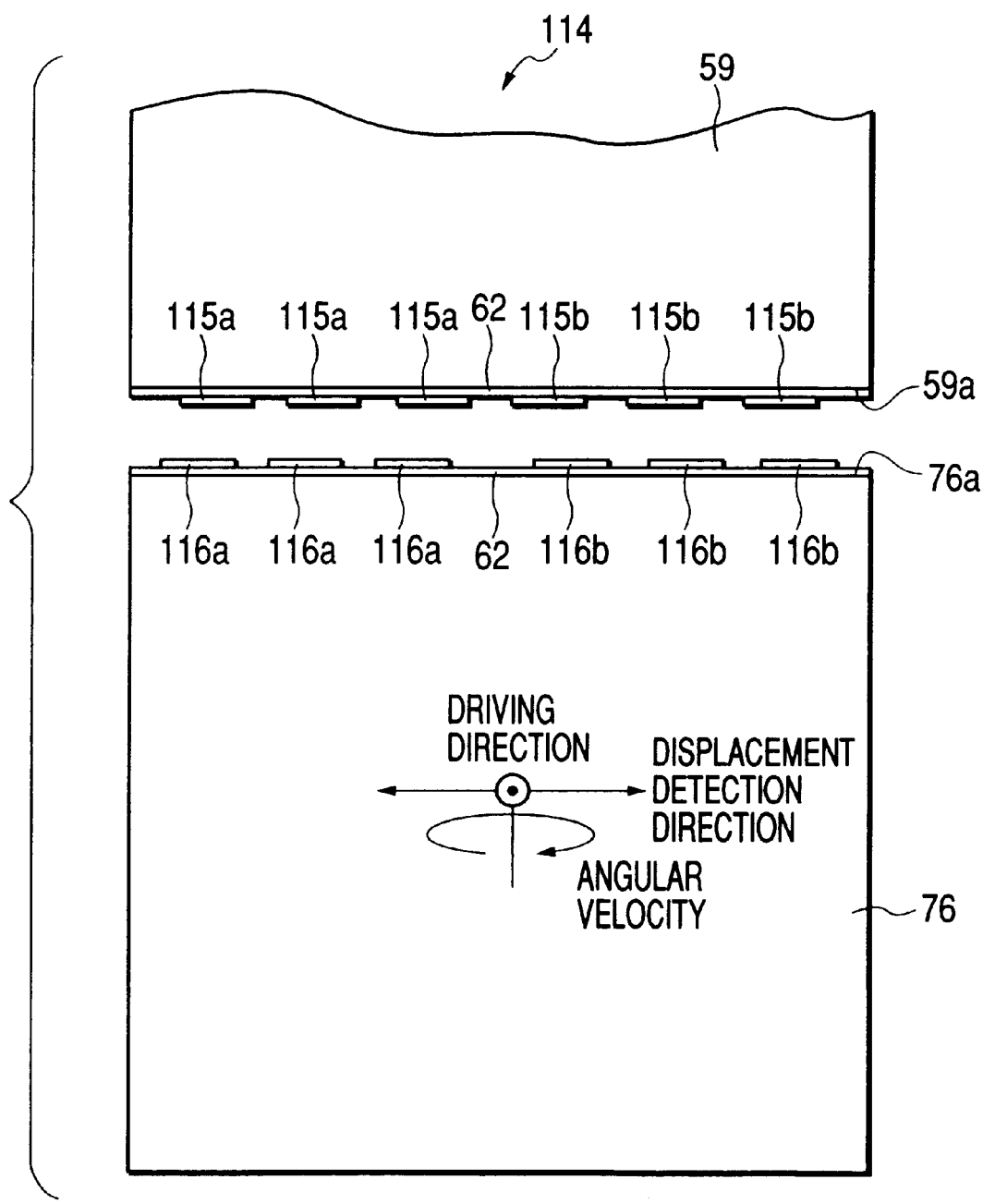
FIG. 27 is an enlarged view illustrating the electrode structure of one leg of a gyroscope of the eleventh embodiment of the present invention.

FIG. 27 is an enlarged plan view illustrating one leg of a gyroscope of the present embodiment. In FIG. 27, the common components shown in FIG. 27 to those shown in FIG. 26 are given the same characters, and the detailed description of the common components are omitted.

As shown in FIG. 27, in the gyroscope 114 of the present embodiment, six detection movable electrodes 115a and 115b are provided for each leg 59 on the free end surface 59a of each leg so as to extend in the direction perpendicular to the displacement detection direction of the leg 59 (in the direction perpendicular to the paper plane). On the other hand, on the surface 76a of the detection electrode mounting member 76 that is facing to the free end surface 59a of the leg 59, six detection fixed electrodes 116a and 116b, one is, provided for each detection movable electrode 115a or 115b and six are provided for each leg 59, are provided so as to face to the corresponding detection movable electrodes 115a and 115b. The outer ends-of electrodes that constitute the left side, three detection fixed electrodes 116a are disposed so as to deviate left side (outside) from the outer ends of the electrodes that constitute the left side three detection movable electrodes 115a by a distance equal to or larger than the maximum amplitude of the leg 59. On the other hand, the outer ends of electrodes that constitute the right side three detection fixed electrodes 116b are disposed so as to deviate right side (outside) from the outer ends of the electrodes that constitute the right side three detection movable electrodes 115b by a distance equal to or larger than the maximum amplitude of the leg 59.

Twelfth Embodiment

The twelfth embodiment of the present invention will be described hereinafter with reference to FIG. 28.

Figure 28:
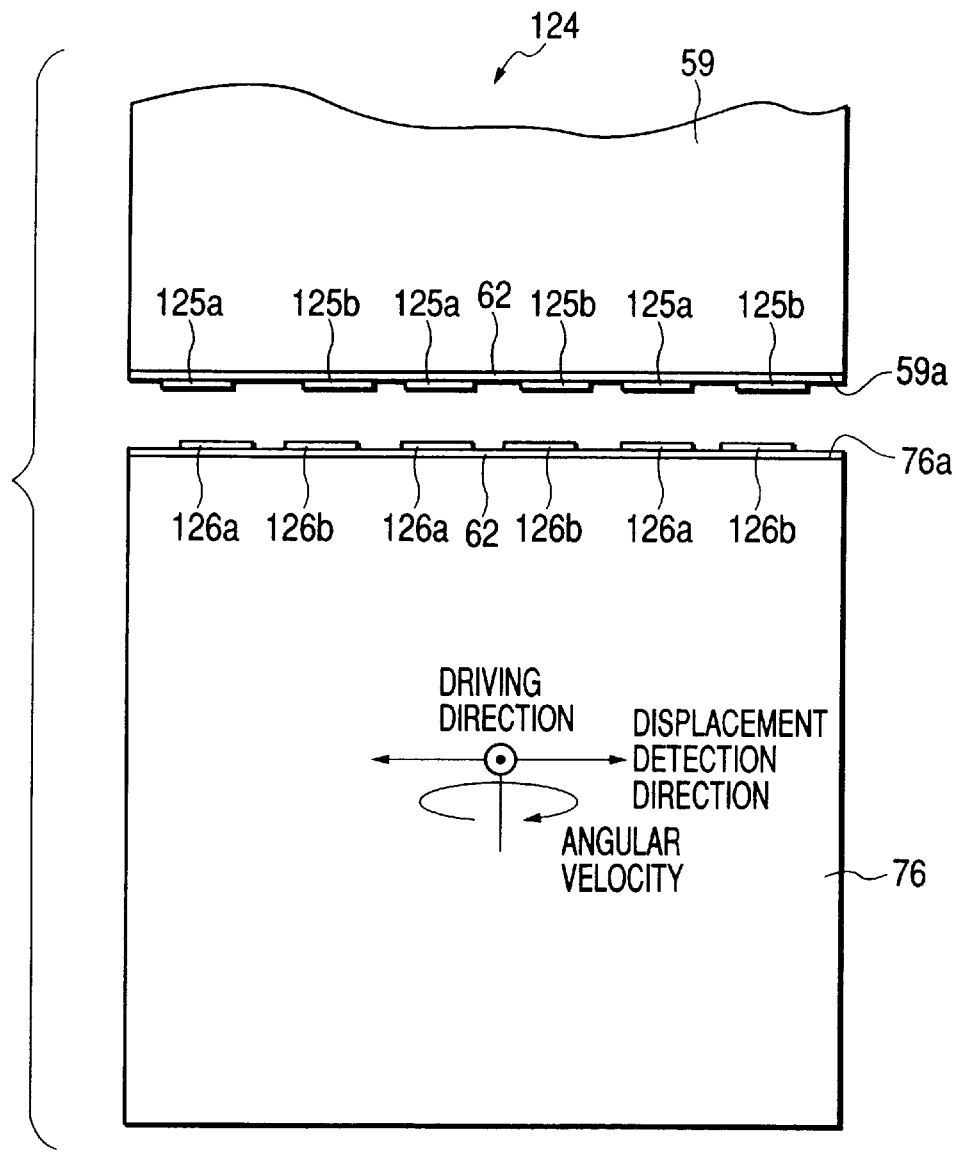
FIG. 28 is an enlarged view illustrating the electrode structure of one leg of a gyroscope of the twelfth embodiment of the present invention.

FIG. 28 is an enlarged plan view illustrating one leg of a gyroscope of the present embodiment. In FIG. 28, the common components shown in FIG. 28 to those shown in FIG. 26 are given the same characters, and the detailed description of the common components are omitted.

As shown in FIG. 28, in the gyroscope 124 of the present embodiment, six detection movable electrodes 125a and 125b are provided for each leg 59 on the free end surface 59a of each leg 59 so as to extend in the direction perpendicular to the displacement detection direction of the leg 59 (in the direction perpendicular to the paper plane). On the other hand, on the surface 76a of the detection electrode mounting member 76 that is facing to the free end surface 59a of the leg 59, six detection fixed electrodes 126a and 126b, one is provided for each detection movable electrode 125a or 125b and six are provided for each leg 59, are provided so as to face to the corresponding detection movable electrodes 125a and 125b. The left ends of the detection movable electrodes 125a that constitute the one electrode group are disposed so as to deviate left side (outside) from the left ends of the detection fixed electrodes 126a that is facing to the corresponding detection movable electrodes 125a. On the other hand, The right ends of the detection movable electrodes 125b that constitute the other electrode group are disposed so as to deviate right side (outside) from the right ends of the detection fixed electrodes 126b that is facing to the corresponding detection movable electrodes 125b.

The same effect as obtained by the tenth embodiment can be obtained by applying the gyroscopes of the eleventh and twelfth embodiments described hereinabove.

Thirteenth Embodiment

Figure 31:
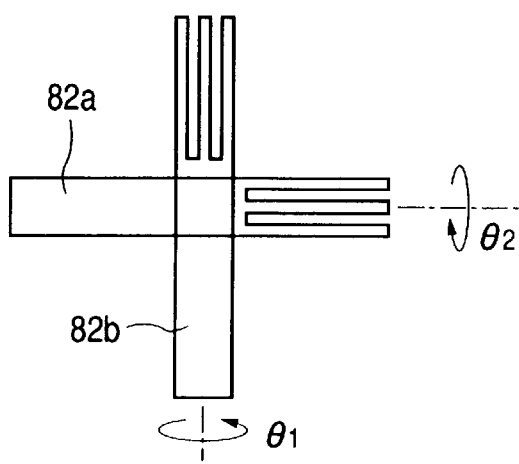
FIG. 31 is a plan view illustrating the layout of two gyroscopes used in the pen-type mouse shown in FIG. 30
Figure 32:
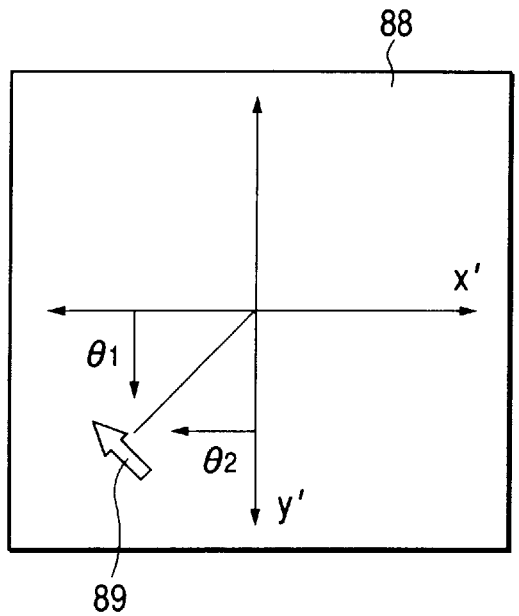
FIG. 32 is a front view illustrating a personal computer screen that is operated by use of the pen-type mouse shown in FIG. 30.
Figure 33:
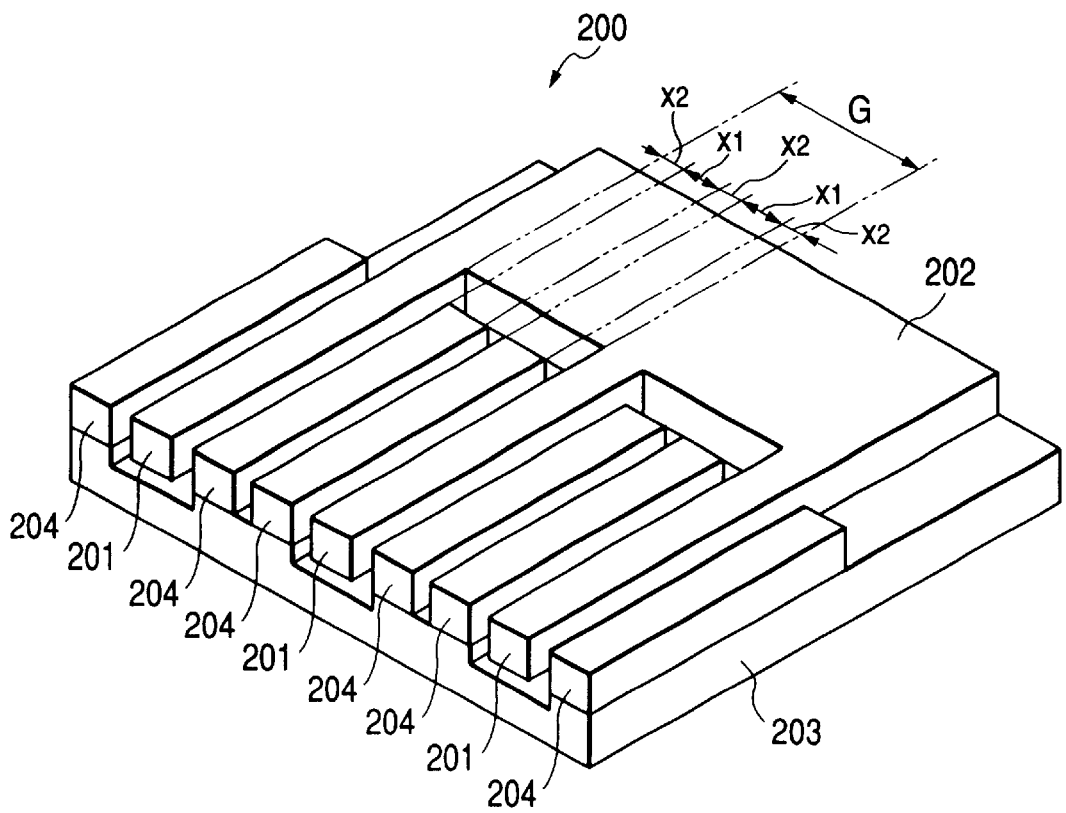
FIG. 33 is a prespective view illustrating a conventional gyroscope.

The thirteenth embodiment of the present invention will be described hereinafter with reference to FIG. 30 to FIG. 32.

The present embodiment involves an exemplary input apparatus in which gyroscopes of any one of the fifth to twelfth embodiments of the present invention are incorporated, in detail an exemplary pen-type mouse served as a coordinate input apparatus for a personal computer.

Figure 30:
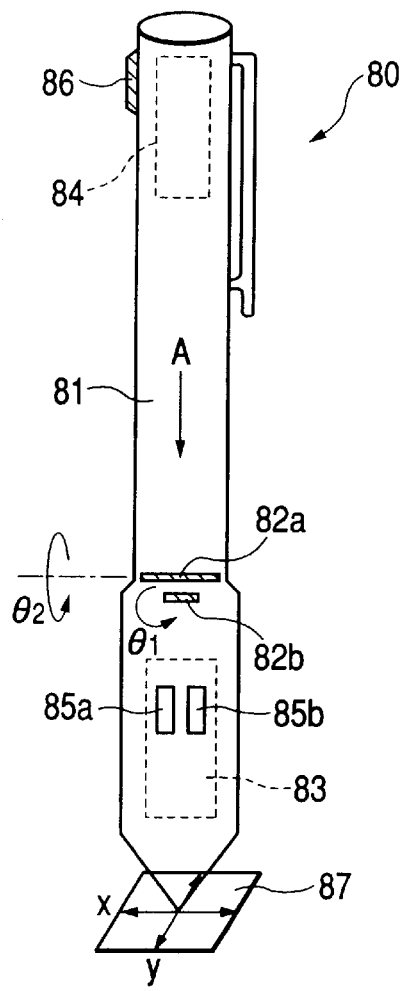
FIG. 30 is a perspective view illustrating a pen-type mouse in accordance with the thirteenth embodiment of the present invention.

As shown in FIG. 30, a pen-type mouse 80 of the present embodiment is provided with two gyroscopes 82a and 82b accommodated in a pen-type case 81 as described in the fifth to twelfth embodiments. The two gyroscopes 82a and 82b are located so that the extension directions of the legs of the tuning forks of the gyroscopes 82a and 82b are orthogonal to each, other in the top view of the pen-type mouse 80 (in the view from the arrow A direction in FIG. 30) as shown in FIG. 31. Furthermore, a driving detection circuit 83 served for driving the gyroscopes 82a and 82b and for detecting the angle of rotation is provided. Furthermore, a battery 84 is accommodated in the case 81, and two switches 85a and 85b that are equivalent to switches of a usual mouse and a switch 86 or the like of the mouse body are provided.

A user holds the pen-type mouse 80 and moves the pen tip in the desired direction, and then the user can move the cursor or the like on the screen of a personal computer in the direction corresponding to the motion of the pen tip. In detail, when the pen tip is moved in X-axis direction on the paper plane 87 in FIG. 10, the gyroscope 82b detects the rotation angle $\theta 1$, and when the pen tip is moved in Y-axis direction on the paper plane 87, then the gyroscope 82a detects the rotation angle $\theta 2$. When the pen tip is moved in the other direction, the rotation angle $\theta 1$ and the rotation angle $\theta 2$ are combined. Therefore, the personal computer side receives the signal corresponding to the rotation angle θ1 and the rotation angle θ2 from the pen type mouse 80, and the cursor 89 is moved by a distance corresponding to the magnitude of the rotation angles θ1 and θ2 correspondingly to X'-axis and Y'-axis on the screen 88 from the point where the cursor 89 or the like is located on the screen 88 as shown in FIG. 32.

As described hereinabove, the operation that is the same as that realized by use of a usual mouse having the optical encoder can be also realized by use of the pen type mouse 80.

Because the gyroscopes 82a and 82b of the present invention used herein is advantageous in the small-size, reduced driving voltage, and high sensitivity, the gyroscope of the present invention is preferably used for the small-sized coordinate input apparatus such as the pen-type mouse 80 of the present embodiment. Furthermore, the gyroscope of the present invention is applied to various input apparatus that detect the angular velocity such as navigation system or head mount display.

The technical scope of the present invention is by no means limited to the above-mentioned embodiments, and various modifications may be applied without departing from the spirit and scope of the present invention. For example, though an example in which the driving electrode is provided on the top side glass substrate side is described in the case of the gyroscope of the above-mentioned embodiments, the driving electrode may be provided on the bottom glass substrate side. Otherwise, the driving electrode may be provided not only on the one glass substrate but also on the other glass substrate. On the other hand, the number of detection electrodes for each leg may be arbitrary. However, the number is desirably as many as possible within working allowable range for improvement of sensitivity. The detection electrode may be formed on the different sides of the three legs, for example, on the top surface side of the first leg, on the bottom surface side of the second leg, and on the top surface side of the third leg. Examples in which the three-leg tuning fork is used are described in the above-mentioned embodiments, but the number of legs is arbitrary, and a one leg tuning fork may be used.

Gyroscope examples in which a tuning fork consisting of silicon is interposed between two glass substrate are described hereinabove, but a gyroscope may not have the top side glass substrate. In this case, the gyroscope has the simple structure. The compatibility between silicon and glass is preferable for bonding them together by means of anodic bonding method, but a substrate having the surface on which glass is coated may be used instead of a glass substrate. Carbon material may be used as the tuning fork material instead of silicon. The present invention is by no means limited by the detailed description of the material and dimension used for forming various components, and various changes and modifications may be applied.

As described hereinbefore, in the gyroscope of the present invention, it is not necessary to provide the detection electrode between legs of a tuning fork unlike the conventional gyroscope, the Q-value can be large, and furthermore the detection sensitivity is improved, the driving voltage is reduced, and the device is miniaturized. Small-sized apparatus such as coordinate input apparatus for computers or the like are realized by using the gyroscope in accordance with the present invention.

What is claimed is:

1. A gyroscope comprising;
a tuning fork including a vibration member,
a base material disposed to face said vibration member,
a driving mechanism to drive and vibrate the vibration member,
a plurality of detection movable electrodes provided at a free end position on a surface of the vibration member, the surface being parallel to a displacement detection direction that is perpendicular to a vibration direction by the driving mechanism, wherein the plurality of detection movable electrodes has a width not less than a maximum amplitude of vibration of the vibration member generated in the displacement detection direction, and
a plurality of detection fixed electrodes provided on the base material disposed to face to the plurality of detection movable electrodes and to form a capacitance between said plurality of detection fixed electrodes and said plurality of detection movable electrodes, wherein the plurality of detection fixed electrodes has a width not less than the maximum amplitude of vibration of the vibration member generated in the displacement detection direction and is electrically connected to each other.

2. The gyroscope as claimed in claim 1, wherein the vibration member is comprised of conductive material, and the plurality of detection movable electrodes are provided with interposition of an insulative film formed at least on the free end portion of the vibration member.

3. The gyroscope as claimed in claim 1, wherein an end of each of the detection movable electrodes and an end of each of the detection fixed electrodes are disposed to deviate from each other by a distance not less than the maximum amplitude of the vibration member in the displacement detection direction.

4. An input apparatus provided with the gyroscope as claimed in claim 1.

5. The input apparatus as claimed in claim 4, wherein the vibration member consists of conductive material, and the plurality of detection movable electrodes are provided with interposition of an insulative film formed at least on the free end portion of the vibration member in the gyroscope.

6. The input apparatus as claimed in claim 4, wherein an end of each of the detection movable electrodes and an end of each of the detection fixed electrodes are disposed to deviate from each other by a distance not less than the maximum amplitude of the vibration member in the displacement detection direction in the gyroscope.

7. A gyroscope comprising;
a vibration member including a tuning fork,
a base material disposed to face said vibration member,
a driving mechanism to drive the vibration member,
a plurality of detection movable electrodes provided on surface side parallel to a displacement detection direction of a free end portion of the vibration member, each of the detection movable electrodes has a width not less than a maximum amplitude of the vibration member in the displacement detection direction, and
detection fixed electrodes comprising two electrode groups, each group of the two electrode groups comprising a plurality of electrodes, electrodes of said two electrode groups being provided on the base material facing the plurality of detection movable electrodes to form a capacitance respectively with any electrode of the plurality of detection movable electrodes, an outer end of each electrode of one electrode group out of the two electrode groups is disposed with deviation to an outside from one outer end of the detection movable electrodes that are facing said each electrode in the one electrode group by a distance not less than the maximum amplitude in the displacement detection direction, an outer end of each electrode of another electrode group out of the two electrode groups is disposed with deviation to an outside from another outer end of the detection movable electrodes that are facing said each electrode in said another electrode group by a distance not less than the maximum amplitude in the displacement detection direction, and each of which electrodes has a width equal to or larger than the maximum amplitude of the vibration member in the displacement detection direction, wherein a difference between a sum of capacitances formed between the one electrode group out of the detection fixed electrodes and the plurality of detection movable electrodes that are facing the one electrode group and a sum of capacitances formed between the another electrode group out of the detection fixed electrodes and the plurality of detection movable electrodes that are facing the another electrode group is detected.

8. A gyroscope comprising;

a vibration member including a tuning fork, a base material disposed to face said vibration member, a driving mechanism to drive the vibration member, a plurality of detection fixed electrodes provided on the base material to face a surface parallel to a displacement detection direction of a free end portion of the vibration member, each of the plurality of detection fixed electrodes has a width not less than a maximum amplitude of the vibration member in the displacement detection direction, and detection movable electrodes comprising two electrode groups, each group of which two electrode groups comprising a plurality of electrodes, electrodes of said two electrode groups being disposed on both sides parallel to the displacement detection direction of the free end portion of the vibration member facing any electrode of the plurality of detection fixed electrodes to form a capacitance with the plurality of detection fixed electrodes, an outer end of each of which electrodes of the one electrode group out of the two electrode groups is disposed with deviation to an outside from one outer end of the detection fixed electrodes that are facing said each electrode of the one electrode group by a distance not less than the maximum amplitude in the displacement detection direction, an outer end of electrodes of another electrode group out of the two electrode groups is disposed with deviation to an outside from another outer end of the detection fixed electrodes that are facing said each electrode of the another electrode group by a distance not less than the maximum amplitude in the displacement detection direction, and each of which electrodes has a width equal to or larger than the maximum amplitude of the vibration member in the displacement detection direction, wherein a difference between a sum of capacitances formed between the one electrode group out of the detection movable electrodes and the plurality of detection fixed electrodes that are facing the one electrode group and a sum of capacitances formed between the another electrode group out of the detection movable electrodes and the plurality of detection fixed electrodes that are facing the another electrode group is detected.

9. The gyroscope as claimed in claim 7, wherein a number of electrodes of the two electrode groups of the detection fixed electrodes is equal to a number of electrodes of the detection movable electrodes.

10. The gyroscope as claimed in claim 8, wherein a number of electrodes of the two electrode groups of the detection movable electrodes is equal to a number of electrodes of the detection fixed electrodes.

11. The gyroscope as claimed in claim 7, wherein the vibration member is comprised of conductive material, and one of the plurality of detection movable electrodes and the plurality of pairs of detection movable electrodes are provided with the interposition of an insulative film on at least the free end portion of the vibration member.

12. The gyroscope as claimed in claim 8, wherein the vibration member is comprised of conductive material, and one of the plurality of detection movable electrodes and the plurality of pairs of detection movable electrodes are provided with the interposition of an insulative film on at least the free end portion of the vibration member.

13. An input apparatus provided with the gyroscope as claimed in claim 7.

14. An input apparatus provided with the gyroscope as claimed in claim 8.

15. The input apparatus as claimed in claim 13, wherein a number of electrodes of the two electrode groups of the detection fixed electrodes is equal to a number of electrodes of the detection movable electrodes in the gyroscope.

16. The input apparatus as claimed in claim 14, wherein a number of electrodes of the two electrode groups of the detection movable electrodes is equal to a number of electrodes of the detection fixed electrodes in the gyroscope.

17. The input apparatus as claimed in claim 13, wherein the vibration member is comprised of conductive material, and one of the plurality of detection movable electrodes and the plurality of pairs of detection movable electrodes are provided with the interposition of an insulative film on at least the free end portion of the vibration member in the gyroscope.

18. The input apparatus as claimed in claim 14, wherein the vibration member is comprised of conductive material, and one of the plurality of detection movable electrodes and the plurality of pairs of detection movable electrodes are provided with the interposition of an insulative film on at least the free end portion of the vibration member in the gyroscope.

19. A gyroscope according to claim 1, wherein the vibration direction is perpendicular to the base material.

20. An input device comprising a gyroscope according to claim 19.

* * * * *